United States Patent
Ueda et al.

(10) Patent No.: US 12,435,205 B2
(45) Date of Patent: Oct. 7, 2025

(54) RESIN COMPOSITION AND MOLDED ARTICLE THEREOF

(71) Applicant: ADEKA CORPORATION, Tokyo (JP)

(72) Inventors: Naoto Ueda, Saitama (JP); Satoshi Fukui, Saitama (JP)

(73) Assignee: ADEKA CORPORATION, Tokyo (JP)

(*) Notice: Subject to any disclaimer, the term of this patent is extended or adjusted under 35 U.S.C. 154(b) by 0 days.

(21) Appl. No.: 17/613,307

(22) PCT Filed: May 22, 2020

(86) PCT No.: PCT/JP2020/020315
§ 371 (c)(1),
(2) Date: Nov. 22, 2021

(87) PCT Pub. No.: WO2020/241503
PCT Pub. Date: Dec. 3, 2020

(65) Prior Publication Data
US 2022/0235198 A1   Jul. 28, 2022

(30) Foreign Application Priority Data
May 24, 2019   (JP) .................................. 2019-097967

(51) Int. Cl.
C08K 5/3492   (2006.01)
C08K 5/1575   (2006.01)
C08L 23/00   (2006.01)

(52) U.S. Cl.
CPC .......... *C08K 5/3492* (2013.01); *C08K 5/1575* (2013.01); *C08L 23/00* (2013.01)

(58) Field of Classification Search
CPC ............................ C08K 5/1575; C08K 5/3492
See application file for complete search history.

(56) References Cited

U.S. PATENT DOCUMENTS

| | | | |
|---|---|---|---|
| 3,275,592 A | 9/1966 | Oswald et al. | |
| 6,159,608 A * | 12/2000 | Friedman | B32B 17/10788 428/441 |
| 6,562,886 B1 | 5/2003 | Minami et al. | |
| 2012/0190797 A1 | 7/2012 | Kristiansen et al. | |
| 2016/0115295 A1 * | 4/2016 | Yamazaki | C08K 5/1575 252/182.24 |
| 2018/0286588 A1 | 10/2018 | Tamura et al. | |
| 2024/0010815 A1 * | 1/2024 | Tada | C08J 3/203 |

FOREIGN PATENT DOCUMENTS

| | | |
|---|---|---|
| EP | 3 858 909 A1 | 4/2021 |
| JP | 54004949 A * | 1/1979 |
| JP | 61-14261 A | 1/1986 |
| JP | 089679 B2 * | 1/1996 |
| JP | H09-165476 A | 6/1997 |
| JP | H09-176407 A | 7/1997 |
| JP | H11-1584 A | 1/1999 |
| JP | H11-323029 A | 11/1999 |
| JP | 2000-143835 A | 5/2000 |
| JP | 2004-043788 A | 2/2004 |
| JP | 2009-507982 A | 2/2009 |
| JP | 2013-505309 A | 2/2013 |
| JP | 2018-095698 A | 6/2018 |
| JP | 2019-044063 A | 3/2019 |
| JP | 2019-137017 A | 8/2019 |
| JP | 2021-001356 A | 1/2021 |
| JP | 2021-001357 A | 1/2021 |
| WO | WO 2007/032797 A1 | 3/2007 |
| WO | WO 2016/159044 A1 | 10/2016 |
| WO | WO 2020/067144 A1 | 4/2020 |

OTHER PUBLICATIONS

Machine translation of JP 08-009679 B2, published Jan. 31, 1996.*
Machine translation of JP 54-004949 A, published Jan. 16, 1979.*
Written Opinion for Japanese Application No. 2021-700623, dated Mar. 11, 2022, including an English translation.
Bernland et al., "Phase behavior and optical- and mechanical properties of the binary system isotactic polypropylene and the nucleating/clarifying agent 1,2,3-trideoxy-4,6:5,7-bis-O-[(4-propylphenyl) methylene ]-nonitol," Polymer, vol. 50, 2009, pp. 2460-2464.
International Search Report for PCT/JP2020/020315 (PCT/ISA/210) mailed on Jul. 14, 2020, with English Translation.
Kristiansen et al., "The Binary System Isotactic Polypropylene/Bis(3,4-dimethylbenzylidene)sorbitol: Phase Behavior, Nucleation, and Optical Properties," Macromolecules, vol. 36, No. 14, 2003, 5150-5156.
Marco et al., "Comparative Study of the Nucleation Activity of Third-Generation Sorbitol-Based Nucleating Agents for Isotactic Polypropylene," Journal of Applied Polymer Science, vol. 84, 2002, pp. 2440-2450.
Notice of Revocation in Patent Opposition No. 2021-700623 for JP patent No. 6824482 dated Nov. 30, 2021, with Machine Translation.
Patent Opposition No. 2021-700623 for JP patent No. 6824482 dated Jul. 2, 2021, with Machine Translation.

(Continued)

*Primary Examiner* — Vickey Nerangis
(74) *Attorney, Agent, or Firm* — Birch, Stewart, Kolasch & Birch, LLP

(57) ABSTRACT

Provided are: a resin composition in which a resin component has a reduced crystallinity; and a molded article of the same. The resin composition contains a polyolefin-based resin and a nucleating agent. In this resin composition, the nucleating agent is a nucleating agent that melts at a temperature 150° C. higher than the melting point of the polyolefin-based resin, or a nucleating agent that dissolves in the polyolefin-based resin at a temperature 150° C. higher than the melting point of the polyolefin-based resin; the nucleating agent, when added in an amount of 0.2 parts by mass with respect to 100 parts by mass of the polyolefin-based resin, increases the crystallization temperature of the polyolefin-based resin by at least 7° C.; and the nucleating agent is contained in an amount of 0.005 parts by mass or more but less than 0.1 parts by mass with respect to 100 parts by mass of the polyolefin-based resin.

1 Claim, 1 Drawing Sheet

(56) References Cited

OTHER PUBLICATIONS

Zhou et al., "Relationship Between Molecular Structure and Nucleation of Benzylidene Acetals in Isotactic Polypropylene," Polymer Composites, vol. 33, 2012, pp. 371-378.
Japanese Written Opinion for Japanese Application No. 2021-700623, dated Sep. 21, 2022, with English translation.
Minagawa, "Note on the use of plastic additives," Kogyo Chosakai Publishing Co., Ltd., Jul. 15, 1996, 27 pages total, with partial English translation.
Japanese Written Opinion for Japanese Application No. 2021-700623, mailed on Aug. 17, 2023, with English translation.
Inoue, "Polypropylene," Organic Synthetic Chemistry, vol. 17, No. 4, 1959, pp. 205-212 (9 pages total), with partial English translation.
Kristiansen et al., "Mechanical Properties of Sorbitol-Clarified Isotactic Polypropylene: Influence of Additive Concentration on Polymer Structure and Yield Behavior," Macromolecules, vol. 38, 2005, pp. 10461-10465.
Maharramov et al., "Role of Structure of the PP/Magnetite Nanocomposites on Their Thermal Properties," Chemical Engineering Transactions, vol. 60, 2017, pp. 1-6.
Schawe et al., "Non-isothermal crystallization of polypropylene with sorbitol-type nucleating agents at cooling rates used in processing," Polym Int, vol. 68, 2019 (Published online May 3, 2018), pp. 240-247.
Notice of Reasons for Revocation for corresponding Japanese Application No. 2020-543954, dated May 31, 2022, including an English translation.
Written Opinion for Japanese Opposition No. 2021-700623, dated Mar. 11, 2022, including an English translation.

* cited by examiner

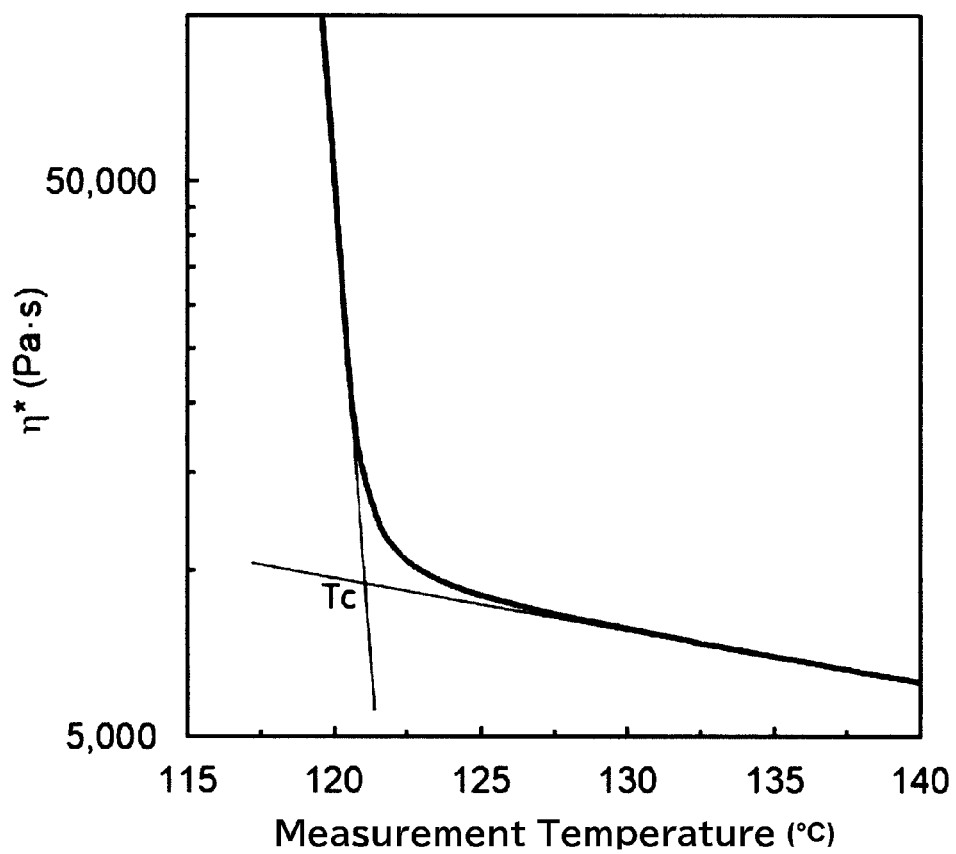

RESIN COMPOSITION AND MOLDED ARTICLE THEREOF

TECHNICAL FIELD

The present invention relates to a resin composition and a molded article thereof. More particularly, the present invention relates to a resin composition in which a resin component has a reduced crystallinity and a molded article of the same.

BACKGROUND ART

In the production of a synthetic fiber or a film by processing a resin material containing a crystalline resin such as a polyolefin-based resin or a polyamide resin, or in the production of a laminate by laminating such a resin material on a base material made of a woody or fibrous material or the like, it is desired that the crystallinity of the resin component be sufficiently reduced.

As a resin composition in which a resin component has a reduced crystallinity, for example, Patent Document 1 proposes a resin composition containing a silicone oil.

RELATED ART DOCUMENT

Patent Document

[Patent Document 1] JPH09-176407A

SUMMARY OF THE INVENTION

Problems to be Solved by the Invention

However, the resin composition disclosed in Patent Document 1 contains the silicone oil in a large amount for reduction of the crystallinity of its resin component and, as a result, there are cases where a molded article obtained from this resin composition does not have sufficient physical properties.

Therefore, an object of the present invention is to provide a resin composition in which a resin component has a reduced crystallinity and a molded article of the same.

Means for Solving the Problems

The present inventors intensively studied to solve the above-described problem and consequently discovered that the problem can be solved by a polyolefin-based resin composition which contains a nucleating agent having specific properties at a specific ratio, thereby completing the present invention.

That is, the resin composition of the present invention is a resin composition containing a polyolefin-based resin and a nucleating agent, the resin composition being characterized in that:

the nucleating agent is a nucleating agent that melts at a temperature 150° C. higher than the melting point of the polyolefin-based resin, or a nucleating agent that dissolves in the polyolefin-based resin at a temperature 150° C. higher than the melting point of the polyolefin-based resin;

the nucleating agent, when added in an amount of 0.2 parts by mass with respect to 100 parts by mass of the polyolefin-based resin, increases the crystallization temperature of the polyolefin-based resin by at least 7° C.; and the nucleating agent is contained in an amount of 0.005 parts by mass or more but less than 0.1 parts by mass with respect to 100 parts by mass of the polyolefin-based resin.

In the resin composition of the present invention, the nucleating agent preferably has a melting point of 150 to 300° C. In the resin composition of the present invention, it is preferred that the nucleating agent contain a triazine compound represented by the following Formula (1):

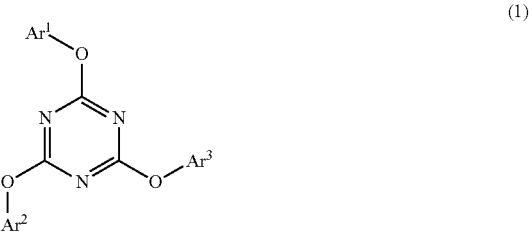

(1)

In Formula (1), $Ar^1$, $Ar^2$ and $Ar^3$ each independently represent a substituted or unsubstituted phenyl group.

Further, in the resin composition of the present invention, it is also preferred that the nucleating agent contain an acetal compound represented by the following Formula (2):

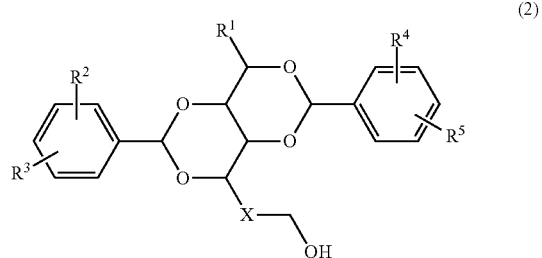

(2)

In Formula (2), $R^1$ represents a hydrogen atom or an alkyl group having 1 to 4 carbon atoms; $R^2$, $R^3$, $R^4$ and $R^5$ each independently represent a hydrogen atom, a halogen atom, a cyano group, an alkyl group having 1 to 4 carbon atoms, or an alkoxy group having 1 to 4 carbon atoms, or $R^2$ and $R^3$ or $R^4$ and $R^5$ are linked together to represent an alkylene group having 3 to 6 carbon atoms or an alkylenedioxy group having 1 to 4 carbon atoms; and X represents a single bond, a —CH(OH)— group, or a —CH(OH)CH(OH)— group.

In the resin composition of the present invention, the "melting point" of the polyolefin-based resin is determined by measurement using a differential scanning calorimeter, and it means the temperature of an endothermic peak top that is observed when the polyolefin-based resin is heated under a nitrogen atmosphere from room temperature at a rate of 10° C./min. Further, the "melting point" of the nucleating agent is determined by measurement using a differential scanning calorimeter in the same manner, and it means the temperature of an endothermic peak top that is observed when the nucleating agent is heated under a nitrogen atmosphere from room temperature at a rate of 10° C./min.

In the resin composition of the present invention, the "crystallization temperature" of the polyolefin-based resin means a crystallization temperature measured in accordance with JIS K7121 using a differential scanning calorimeter.

The molded article of the present invention is characterized in that it is obtained by molding the resin composition of the present invention.

Effects of the Invention

According to the present invention, a resin composition in which a resin component has a reduced crystallinity and a molded article of the same can be provided.

BRIEF DESCRIPTION OF THE DRAWING

FIG. 1 is a graph obtained by plotting the complex viscosity η* of the resin composition of Example 12, which was determined by dynamic viscoelasticity measurement, against the measurement temperature.

MODE FOR CARRYING OUT THE INVENTION

Embodiments of the present invention will now be described in detail.
<Resin Composition>
The resin composition of the present invention contains a polyolefin-based resin and a nucleating agent. In the composition of the present invention, the nucleating agent melts at a temperature 150° C. higher than the melting point of the polyolefin-based resin, or dissolves in the polyolefin-based resin at a temperature 150° C. higher than the melting point of the polyolefin-based resin, and the nucleating agent, when added in an amount of 0.2 parts by mass with respect to 100 parts by mass of the polyolefin-based resin, increases the crystallization temperature of the polyolefin-based resin by at least 7° C. Further, in the resin composition of the present invention, the nucleating agent is contained in an amount of 0.005 parts by mass or more but less than 0.1 parts by mass with respect to 100 parts by mass of the polyolefin-based resin. By adopting this constitution, the crystallinity of the resin component is reduced in the resin composition of the present invention. The reason for this is believed to be as follows.

When a resin composition obtained by adding the nucleating agent according to the resin composition of the present invention to a polyolefin-based resin in a conventional amount (e.g., 0.2 parts by mass with respect to 100 parts by mass of the resin) is heat-plasticized, the nucleating agent is melted or dissolved in the polyolefin-based resin, and thereby dispersed in the resin matrix. Cooling of a resin melt obtained in this manner causes the nucleating agent in the resin matrix to undergo self-assembly to form fine crystals. These fine crystals serve as crystal nuclei to facilitate crystallization of the polyolefin-based resin.

On the other hand, when the resin composition of the present invention is heat-plasticized and subsequently cooled in the same manner, the nucleating agent cannot undergo self-assembly in the resin matrix since the concentration of the nucleating agent in the resin matrix is sufficiently low. In addition, due to strong interaction between the nucleating agent molecules and the resin molecules, crystal domain expansion of the resin molecules is inhibited. It is presumed that, as a result of the above, crystallization of the polyolefin-based resin is inhibited in the resin composition of the present invention. The components according to the resin composition of the present invention will now be described in detail.
<Polyolefin-Based Resin>
The polyolefin-based resin according to the resin composition of the present invention can be used regardless of, for example, the molecular weight, the polymerization degree, the density, the softening point, the insoluble component-to-solvent ratio, the degree of stereoregularity, the presence or absence of a catalyst residue, the type and blend ratio of each monomer used as a raw material, and the type of a polymerization catalyst (e.g., a Ziegler catalyst or a metallocene catalyst). In the resin composition of the present invention, the "polyolefin-based resin" refers to a resin component which contains a polyolefin at a ratio of 70% by mass or higher, preferably 80% by mass or higher, more preferably 90% by mass or higher, particularly preferably 100% by mass.

Examples of the polyolefin-based resin include: α-olefin polymers, such as polyethylenes, low-density polyethylenes, linear low-density polyethylenes, high-density polyethylenes, polypropylenes, homopolypropylenes, random copolymer polypropylenes, block copolymer polypropylenes, impact copolymer polypropylenes, high-impact copolymer polypropylenes, isotactic polypropylenes, syndiotactic polypropylenes, hemi-isotactic polypropylenes, maleic anhydride-modified polypropylenes, polybutenes, cycloolefin polymers, stereo block polypropylenes, poly-3-methyl-1-butenes, poly-3-methyl-1-pentenes, and poly-4-methyl-1-pentenes; and α-olefin copolymers, such as ethylene-propylene block or random copolymers, ethylene-methyl methacrylate copolymers, and ethylene-vinyl acetate copolymers, and the polyolefin-based resin may be an elastomer as well. In the resin composition of the present invention, two or more of such polyolefin-based resins may be used as a blend, may form a block copolymer to be used as a block polymer-type resin, or may be alloyed. Further, the polyolefin-based resin may be a chlorination product of any of the above-described resins.

Examples of an elastomer of the polyolefin-based resin include elastomers obtained by blending a polyolefin (e.g., polypropylene or polyethylene) as a hard segment and a rubber (e.g., ethylene-propylene rubber) as a soft segment, and elastomers obtained by dynamic cross-linking of these segments.

The hard segment is, for example, at least one selected from polypropylene homopolymers, polypropylene block copolymers, polypropylene random copolymers and the like.

The soft segment is, for example, an ethylene-propylene copolymer (EPM), an ethylene-propylene-diene copolymer (EPDM), an ethylene-vinyl acetate copolymer (EVA), or a vinyl acetate homopolymer. A blend of two or more of these polymers may be used as well.
<Nucleating Agent>
The nucleating agent according to the resin composition of the present invention is a nucleating agent that melts at a temperature 150° C. higher than the melting point of the polyolefin-based resin, or a nucleating agent that dissolves in the polyolefin-based resin at a temperature 150° C. higher than the melting point of the polyolefin-based resin. When the nucleating agent is a nucleating agent that melts at a temperature 150° C. higher than the melting point of the polyolefin-based resin, the nucleating agent is melted to be in a liquid state during molding the resin composition and thereby dispersed in a melt of the plasticized polyolefin-based resin. When the nucleating agent is a nucleating agent that dissolves in the polyolefin-based resin at a temperature 150° C. higher than the melting point of the polyolefin-based resin, the nucleating agent is dissolved and dispersed in a melt of the plasticized polyolefin-based resin during molding the resin composition.

The nucleating agent contained in the resin composition of the present invention is preferably a nucleating agent that melts at a temperature 120° C. higher than the melting point of the polyolefin-based resin or dissolves in the polyolefin-based resin at a temperature 120° C. higher than the melting point of the polyolefin-based resin, more preferably a nucleating agent that melts at a temperature 100° C. higher than the melting point of the polyolefin-based resin or dissolves in the polyolefin-based resin at a temperature 100° C. higher than the melting point of the polyolefin-based resin, particularly preferably a nucleating agent that melts at a temperature 70° C. higher than the melting point of the polyolefin-based resin or dissolves in the polyolefin-based resin at a temperature 70° C. higher than the melting point of the polyolefin-based resin.

The nucleating agent contained in the resin composition of the present invention preferably has a melting point of 150 to 300° C. When the melting point of the nucleating agent is 150° C. or higher, the crystallinity of the resin component is reduced more effectively. Meanwhile, when the melting point of the nucleating agent is 300° C. or lower, the molding temperature of the resin composition can be sufficiently lowered, so that coloration and deterioration of the physical properties can be inhibited in the resulting molded article. The melting point of the nucleating agent is more preferably 280° C. or lower, still more preferably 250° C. or lower, particularly preferably 230° C. or lower. Further, the melting point of the nucleating agent is more preferably 180° C. or higher, still more preferably 200° C. or higher.

As described above, the nucleating agent according to the resin composition of the present invention increases the crystallization temperature of the polyolefin-based resin by at least 7° C. when added in an amount of 0.2 parts by mass with respect to 100 parts by mass of the polyolefin-based resin. Molecules of a nucleating agent that increases the crystallization temperature of the polyolefin-based resin by an extent of less than 7° C. when added in an amount of 0.2 parts by mass with respect to 100 parts by mass of the polyolefin-based resin are not considered to have a sufficiently strong interaction with resin molecules and thus cannot effectively inhibit the crystal domain expansion of the resin molecules. Accordingly, a nucleating agent that increases the crystallization temperature of the polyolefin-based resin by an extent of less than 7° C. when added in an amount of 0.2 parts by mass with respect to 100 parts by mass of the polyolefin-based resin cannot sufficiently inhibit the crystallization of the polyolefin-based resin. In other words, in a case where the nucleating agent is one which increases the crystallization temperature of the polyolefin-based resin by an extent of less than 7° C. when added in an amount of 0.2 parts by mass with respect to 100 parts by mass of the polyolefin-based resin, the crystallinity of the resin component is not sufficiently reduced in the resin composition. The nucleating agent according to the resin composition of the present invention, when added in an amount of 0.2 parts by mass with respect to 100 parts by mass of the polyolefin-based resin, increases the crystallization temperature of the polyolefin-based resin preferably by at least 9° C., more preferably by at least 11° C.

Examples of a compound contained in the nucleating agent according to the resin composition of the present invention include triazine compounds represented by the following Formula (1), acetal compounds represented by the following Formula (2), and amide compounds such as methylene-bisphenylamide and benzenetrisamide. These compounds may be contained in the resin composition individually, or in combination of two or more thereof. Among these compounds, triazine compounds represented by the following Formula (1) and acetal compounds represented by the following Formula (2) are particularly preferred. In other words, the nucleating agent particularly preferably contains a triazine compound represented by the following Formula (1), and it is also particularly preferred that the nucleating agent contain an acetal compound represented by the following Formula (2).

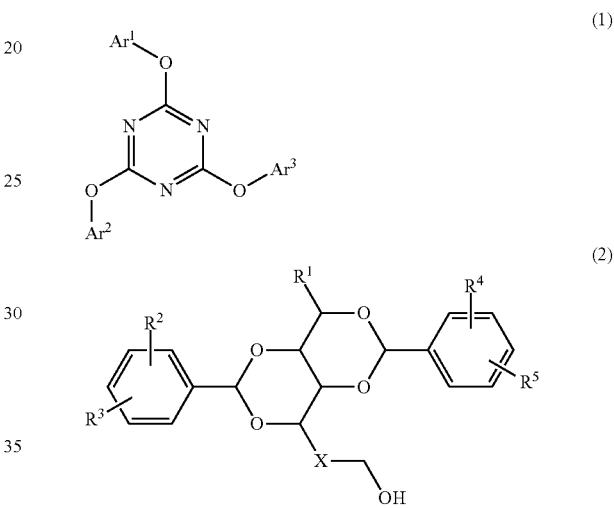

In Formula (1), $Ar^1$, $Ar^2$ and $Ar^3$ each independently represent a substituted or unsubstituted phenyl group.

In Formula (2), $R^1$ represents a hydrogen atom or an alkyl group having 1 to 4 carbon atoms; $R^2$, $R^3$, $R^4$ and $R^5$ each independently represent a hydrogen atom, a halogen atom, a cyano group, an alkyl group having 1 to 4 carbon atoms, or an alkoxy group having 1 to 4 carbon atoms, or $R^2$ and $R^3$ or $R^4$ and $R^5$ are linked together to represent an alkylene group having 3 to 6 carbon atoms or an alkylenedioxy group having 1 to 4 carbon atoms; and X represents a single bond, a —CH(OH)— group, or a —CH(OH)CH(OH)— group.

Examples of a substituent of $Ar^1$, $Ar^2$ and $Ar^3$ in Formula (1) include a halogen atom, a hydroxy group, a carboxy group, an optionally substituted amino group, an aminocarbonyl group (also referred to as "carbamoyl group"), a nitro group, a cyano group, a thiol group, a sulfo group, a sulfonamide group, a formyl group, an optionally substituted alkyl group having 1 to 20 carbon atoms, an optionally substituted aryl group having 6 to 20 carbon atoms, an optionally substituted arylalkyl group having 7 to 20 carbon atoms, an optionally substituted alkoxy group having 1 to 20 carbon atoms, an optionally substituted aryloxy group having 6 to 20 carbon atoms, an optionally substituted alkylthio group having 1 to 20 carbon atoms, an optionally substituted arylthio group having 6 to 20 carbon atoms, an optionally substituted acyl group having 2 to 20 carbon atoms, an optionally substituted acyloxy group having 2 to 20 carbon atoms, an optionally substituted alkoxycarbonyl group having 2 to 20 carbon atoms, an optionally substituted aryloxycarbonyl group having 7 to 20 carbon atoms, an optionally substituted alkylaminocarbonyl group having 2 to 20 carbon atoms, an optionally substituted arylaminocarbonyl group having 7 to 20 carbon atoms, an optionally substituted dialkylaminocarbonyl group having 3 to 20 carbon atoms, an optionally substituted diarylaminocarbonyl group having 13 to 20 carbon atoms, an optionally substituted alkylarylaminocarbonyl group having 8 to 20 carbon atoms, an optionally substituted alkylcarbonylamino group having 2 to 20 carbon atoms, an optionally substituted arylcarbonylamino group having 7 to 20 carbon atoms, and an optionally substituted heterocyclic group having 2 to 20 carbon atoms. The carboxy group and the sulfo group may each be in the form of a salt. The substituent of $Ar^1$, $Ar^2$ and $Ar^3$ is preferably an optionally substituted alkyl group having 1 to 20 carbon atoms, an optionally substituted aryl group having 6 to 20 carbon atoms, an aminocarbonyl group, a carboxy group, a halogen atom, a cyano group, an optionally substituted alkylaminocarbonyl group having 2 to 20 carbon atoms, an optionally substituted alkoxycarbonyl group having 2 to 20 carbon atoms, an optionally substituted acyl group having 2 to 20 carbon atoms, an optionally substituted acyloxy group having 2 to 20 carbon atoms, or an optionally substituted arylalkyl group having 7 to 20 carbon atoms, more preferably an optionally substituted alkyl group having 1 to 20 carbon atoms, an optionally substituted aryl group having 6 to 20 carbon atoms, or an aminocarbonyl group.

Further, examples of a substituent contained in the substituent of $Ar^1$, $Ar^2$ and $Ar^3$ include an alkyl group, an alkoxy group, an alkylthio group, an alkenyl group, an arylalkyl group, an aryl group, an aryloxy group, an arylthio group, a heterocyclic group, a halogen atom, an acyl group, an acyloxy group, a substituted amino group, a sulfonamide group, a sulfonyl group, a carboxy group, a cyano group, a sulfo group, a hydroxy group, a nitro group, a mercapto group, an imide group, a carbamoyl group, and a sulfonamide group. These groups are optionally further substituted. Moreover, the carboxy group and the sulfo group may each be in the form of a salt.

Examples of the alkyl group in $Ar^1$, $Ar^2$ and $Ar^3$ include methyl, ethyl, propyl, isopropyl, cyclopropyl, butyl, sec-butyl, tert-butyl, isobutyl, amyl, isoamyl, tert-amyl, cyclopentyl, hexyl, 2-hexyl, 3-hexyl, cyclohexyl, bicyclohexyl, 1-methylcyclohexyl, heptyl, 2-heptyl, 3-heptyl, isoheptyl, tert-heptyl, n-octyl, isooctyl, tert-octyl, 2-ethylhexyl, nonyl, isononyl, and decyl.

Examples of the alkoxy group in $Ar^1$, $Ar^2$ and $Ar^3$ include methyloxy, ethyloxy, propyloxy, isopropyloxy, butyloxy, sec-butyloxy, tert-butyloxy, isobutyloxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, 2-ethylhexyloxy, nonyloxy, and decyloxy.

Examples of the alkylthio group in $Ar^1$, $Ar^2$ and $Ar^3$ include methylthio, ethylthio, propylthio, isopropylthio, butylthio, sec-butylthio, tert-butylthio, isobutylthio, amylthio, isoamylthio, tert-amylthio, hexylthio, cyclohexylthio, heptylthio, isoheptylthio, tert-heptylthio, n-octylthio, isooctylthio, tert-octylthio, and 2-ethylhexylthio.

Examples of the arylalkyl group in $Ar^1$, $Ar^2$ and $Ar^3$ include benzyl, phenethyl, diphenylmethyl, triphenylmethyl, styryl, and cinnamyl.

Examples of the aryl group in $Ar^1$, $Ar^2$ and $Ar^3$ include phenyl and naphthyl.

Examples of the aryloxy group in $Ar^1$, $Ar^2$ and $Ar^3$ include phenoxy and naphthyloxy.

Examples of the arylthio group in $Ar^1$, $Ar^2$ and $Ar^3$ include phenylthio and naphthylthio.

Examples of the heterocyclic group in $Ar^1$, $Ar^2$ and $Ar^3$ include pyridyl, pyrimidyl, pyridazyl, piperidyl, pyranyl, pyrazolyl, triazyl, pyrrolyl, quinolyl, isoquinolyl, imidazolyl, benzimidazolyl, triazolyl, furyl, furanyl, benzofuranyl, thienyl, thiophenyl, benzothiophenyl, thiadiazolyl, thiazolyl, benzothiazolyl, oxazolyl, benzoxazolyl, isothiazolyl, isoxazolyl, indolyl, 2-pyrrolidinon-1-yl, 2-piperidon-1-yl, 2,4-dioxyimidazolidin-3-yl, and 2,4-dioxyoxazolidin-3-yl.

Examples of the halogen atom in $Ar^1$, $Ar^2$ and $Ar^3$ include fluorine, chlorine, bromine, and iodine.

Examples of the acyl group in $Ar^1$, $Ar^2$ and $Ar^3$ include acetyl, 2-chloroacetyl, propionyl, octanoyl, acryloyl, methacryloyl, phenylcarbonyl(benzoyl), phthaloyl, 4-trifluoromethylbenzoyl, pivaloyl, salicyloyl, oxaloyl, stearoyl, methoxycarbonyl, ethoxycarbonyl, t-butoxycarbonyl, n-octadecyloxycarbonyl, and carbamoyl.

Examples of the acyloxy group in $Ar^1$, $Ar^2$ and $Ar^3$ include acetyloxy and benzoyloxy.

Examples of the alkylaminocarbonyl group in $Ar^1$, $Ar^2$ and $Ar^3$ include methylaminocarbonyl, ethylaminocarbonyl, tert-butylaminocarbonyl, isobutylaminocarbonyl, cyclohexylaminocarbonyl, dimethylaminocarbonyl, N-methyl-N-ethylaminocarbonyl, and diethylaminocarbonyl.

Examples of the optionally substituted amino group in $Ar^1$, $Ar^2$ and $Ar^3$ include amino, ethylamino, dimethylamino, diethylamino, butylamino, cyclopentylamino, 2-ethylhexylamino, dodecylamino, anilino, chlorophenylamino, toluidino, anisidino, N-methyl-anilino, diphenylamino, naphthylamino, 2-pyridylamino, methoxycarbonylamino, phenoxycarbonylamino, acetylamino, benzoylamino, formylamino, pivaloylamino, lauroylamino, carbamoylamino, N,N-dimethylaminocarbonylamino, N,N-diethylaminocarbonylamino, morpholinocarbonylamino, methoxycarbonylamino, ethoxycarbonylamino, t-butoxycarbonylamino, n-octadecyloxycarbonylamino, N-methyl-methoxycarbonylamino, phenoxycarbonylamino, sulfamoylamino, N,N-dimethylaminosulfonylamino, methylsulfonylamino, butylsulfonylamino, and phenylsulfonylamino.

Specific examples of the triazine compound represented by Formula (1) include the following Compounds No. 1 to No. 59. Thereamong, a triazine compound represented by Compound No. 49, Compound No. 50, Compound No. 58, or Compound No. 59 is particularly preferred.

Compound No. 1
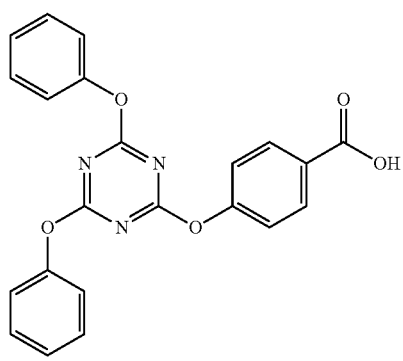
Compound No. 2
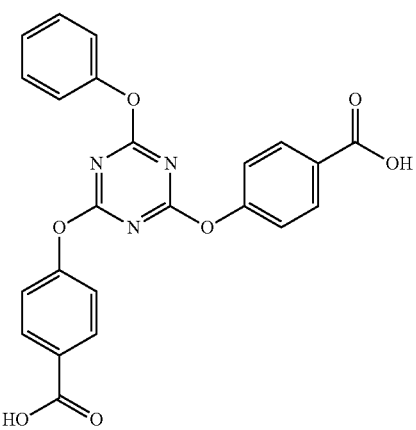
Compound No. 3
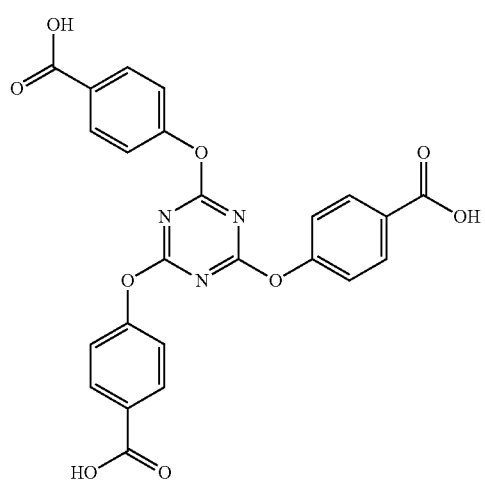
Compound No. 4
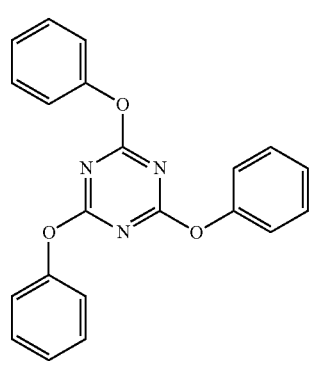
Compound No. 5
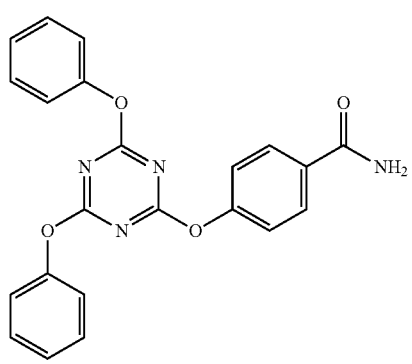
Compound No. 6
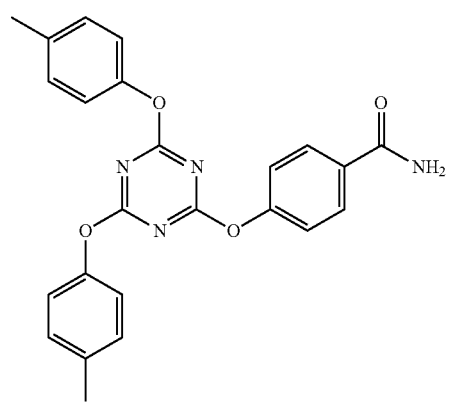

-continued
Compound No. 7
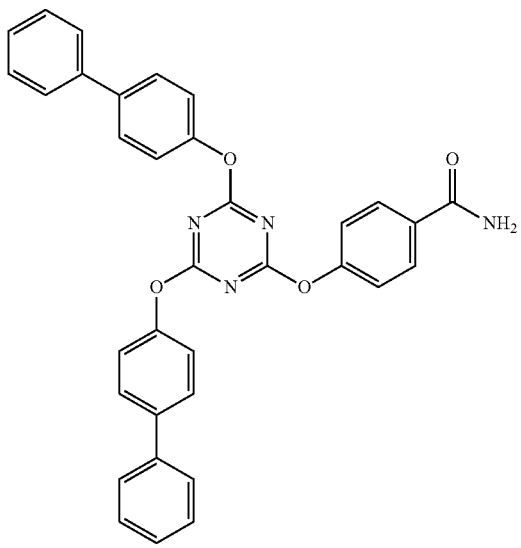
Compound No. 8
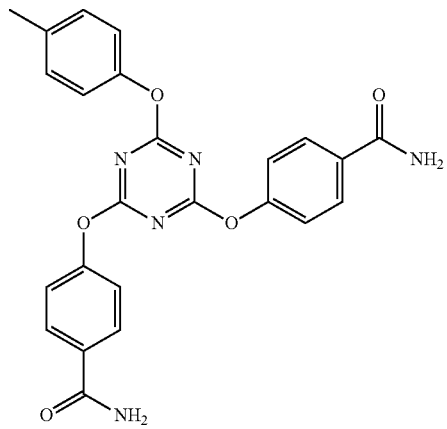
Compound No. 9
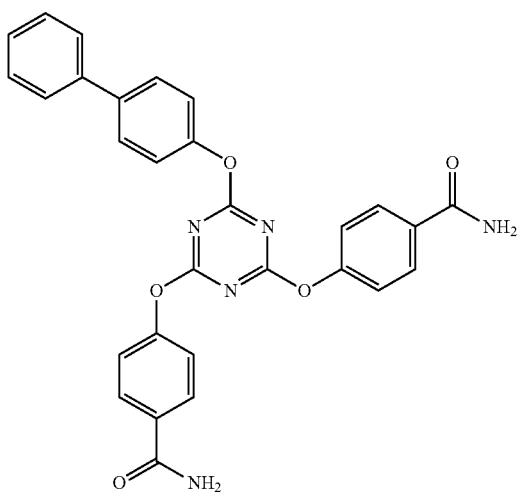
Compound No. 10
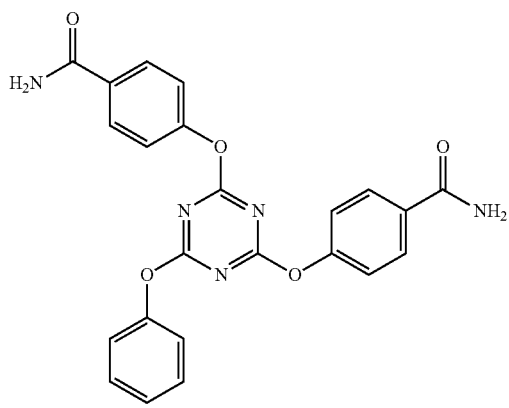
Compound No. 11
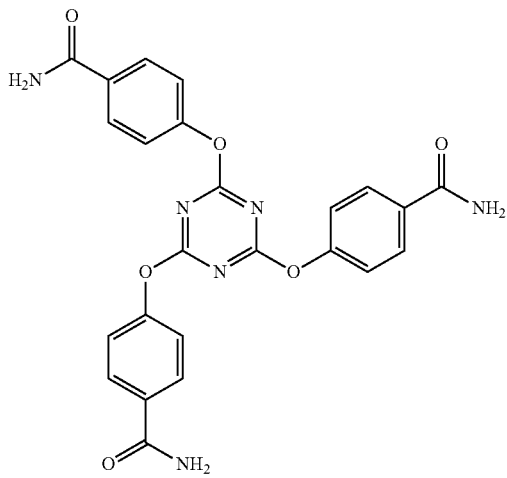
Compound No. 12
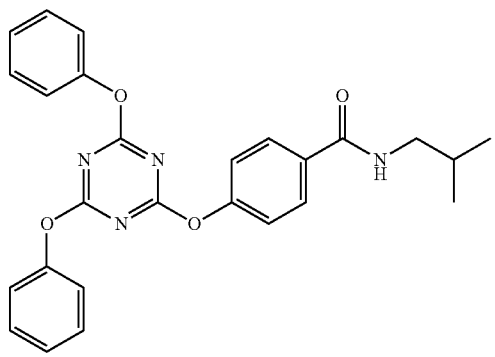

-continued
Compound No. 13
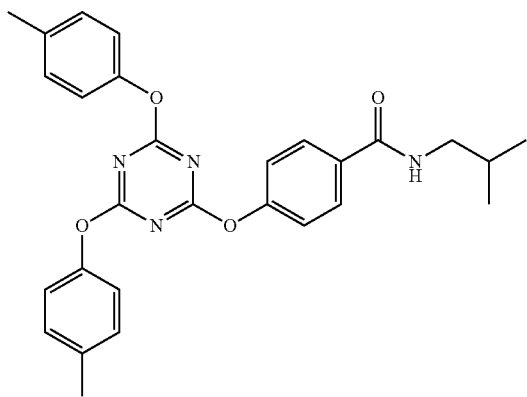
Compound No. 14
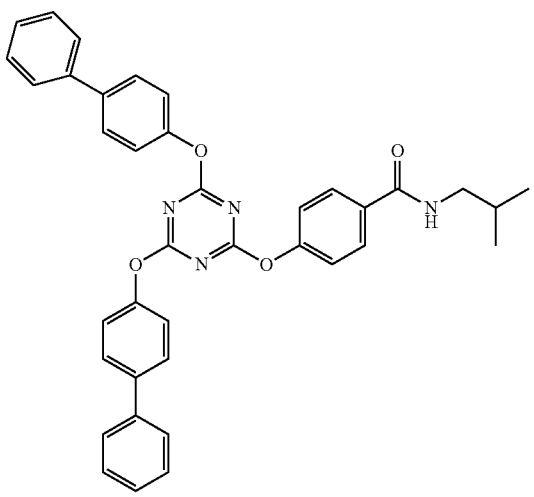
Compound No. 15
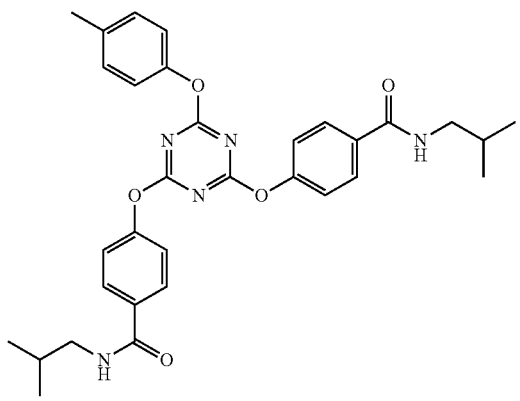
Compound No. 16
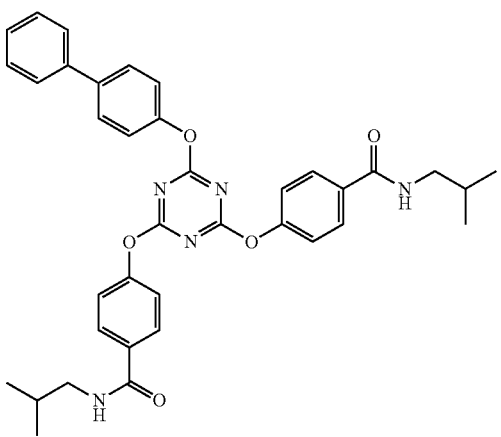
Compound No. 17
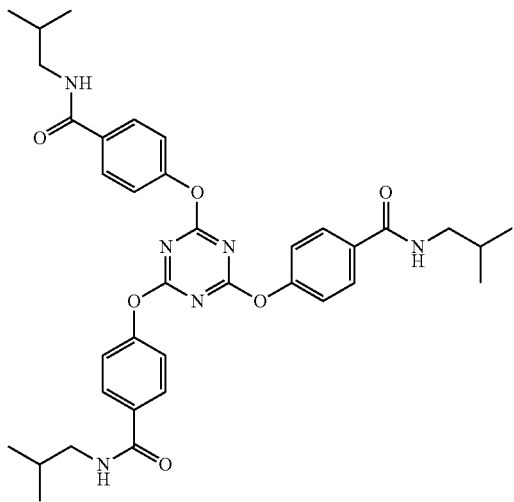
Compound No. 18
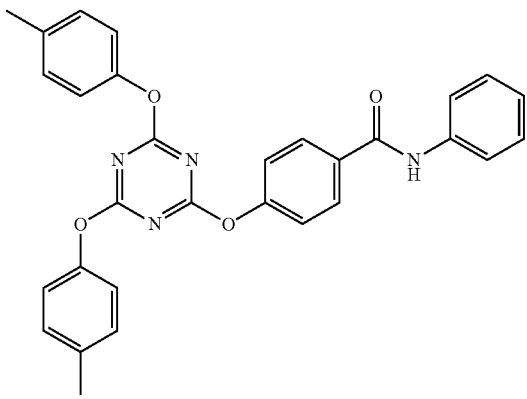

-continued
Compound No. 19
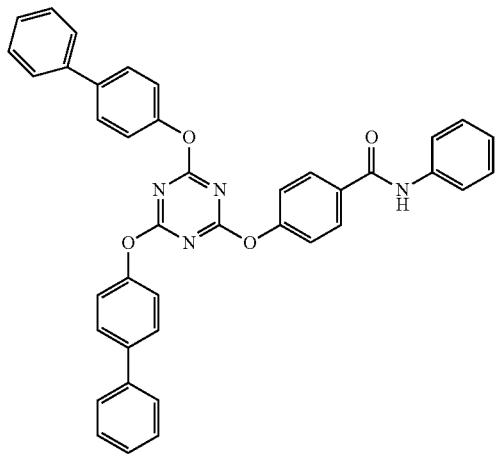
Compound No. 20
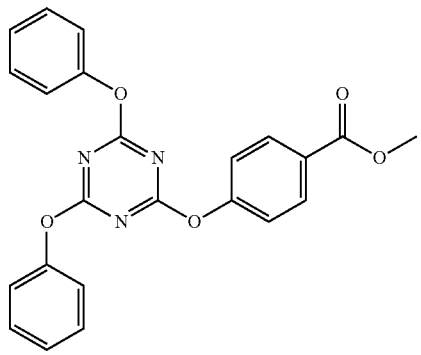
Compound No. 20
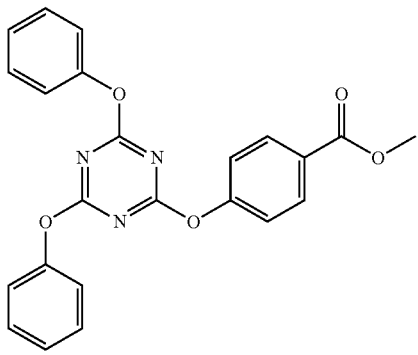
Compound No. 21
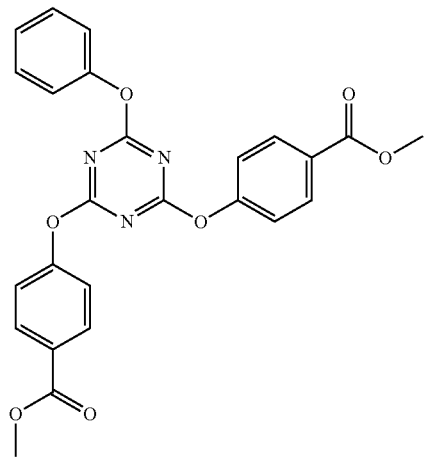
Compound No. 22
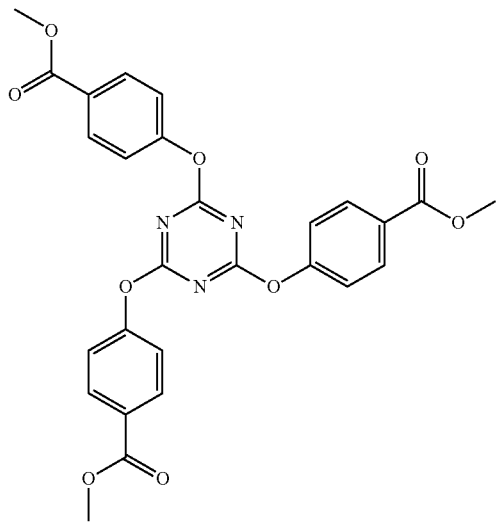
Compound No. 23
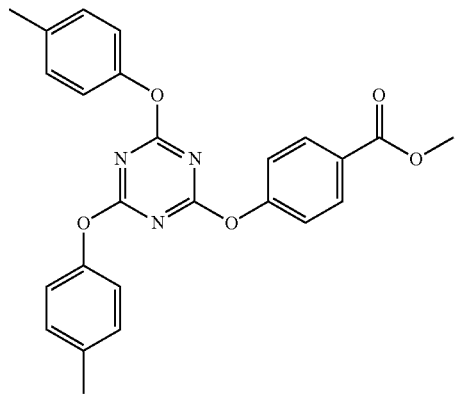

-continued
Compound No. 24
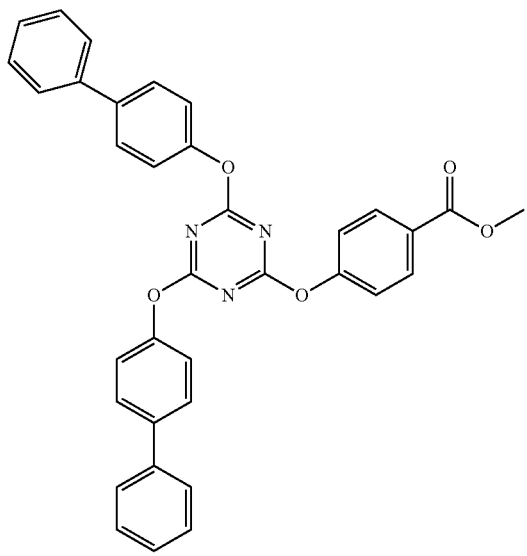
Compound No. 25
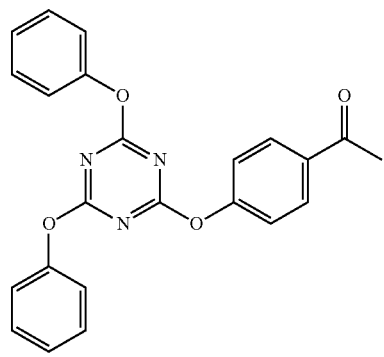
Compound No. 26
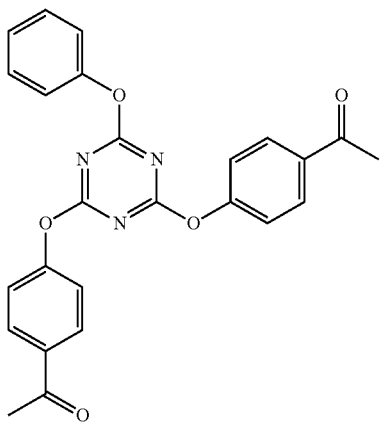
Compound No. 27
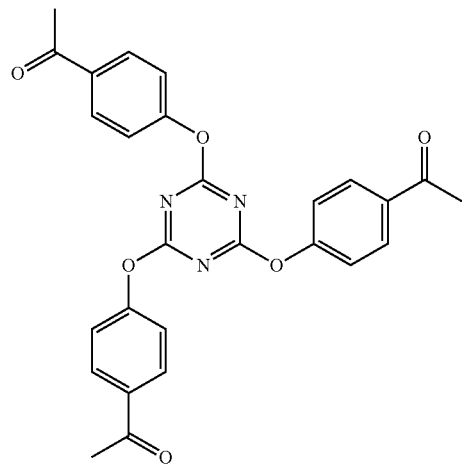
Compound No. 28
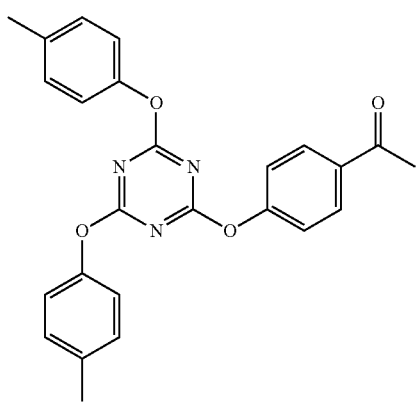
Compound No. 29
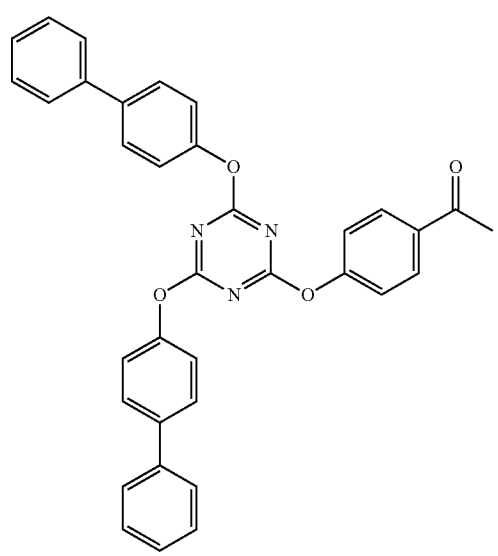

-continued
Compound No. 30
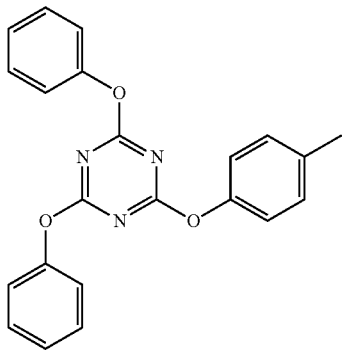
Compound No. 31
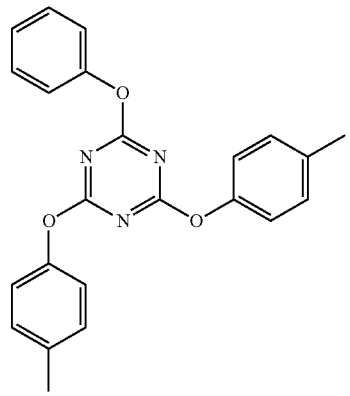
Compound No. 32
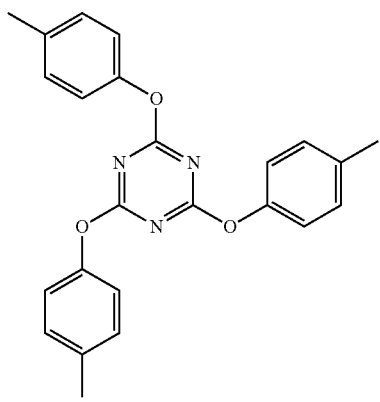
Compound No. 33
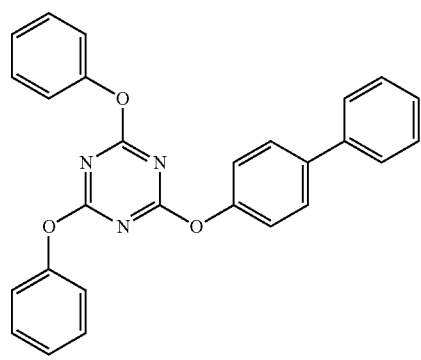
Compound No. 34
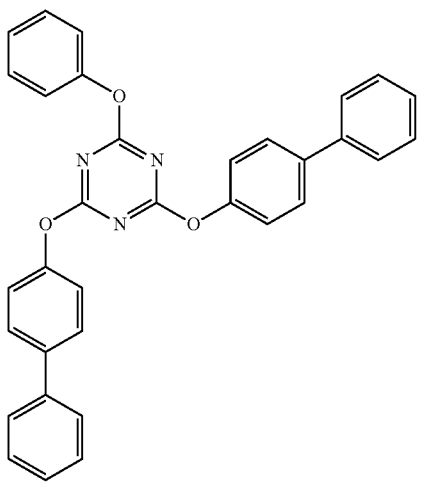
Compound No. 35
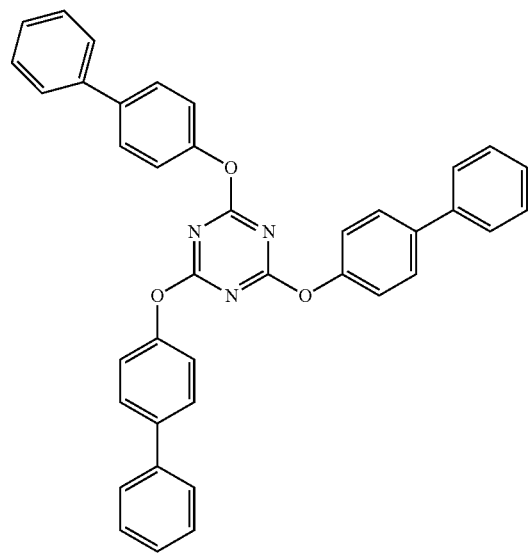

-continued
Compound No. 36
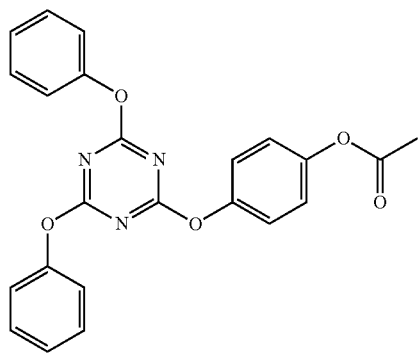
Compound No. 37
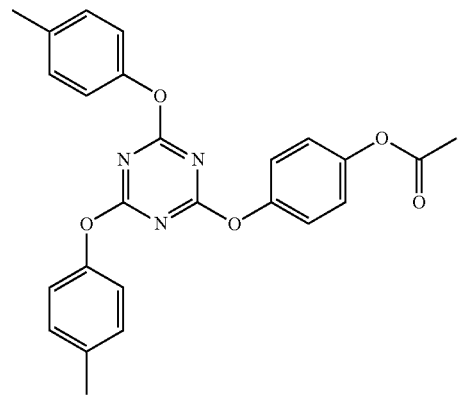
Compound No. 38
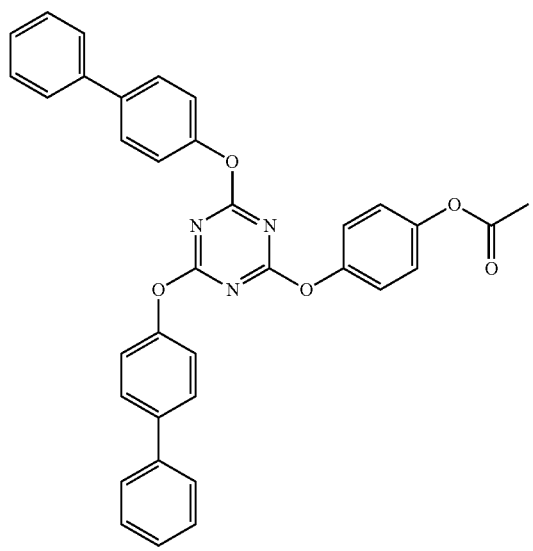
Compound No. 39
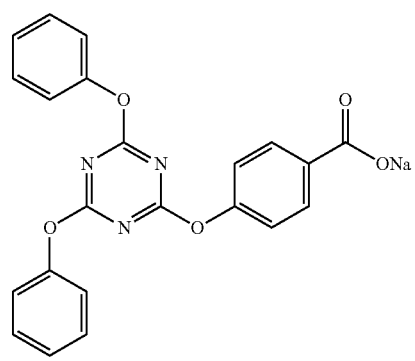
Compound No. 40
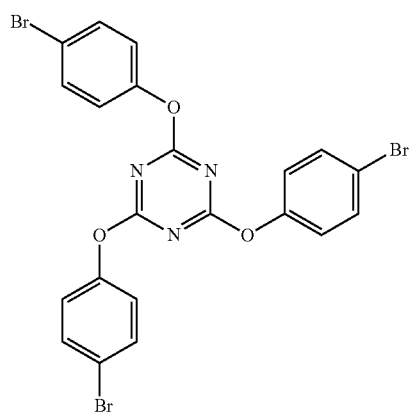
Compound No. 41
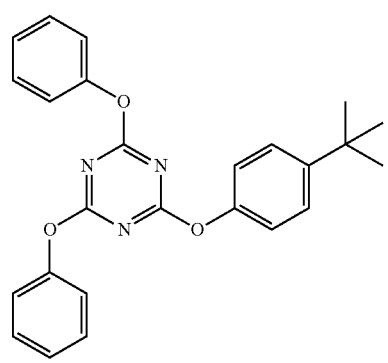

-continued
Compound No. 42
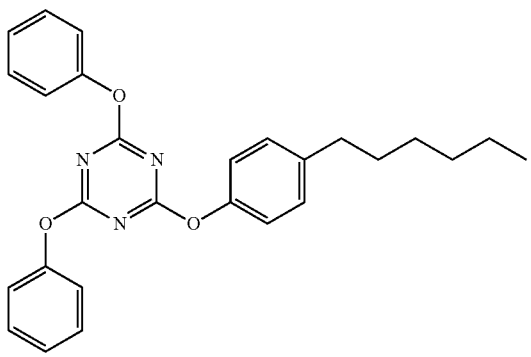
Compound No. 43
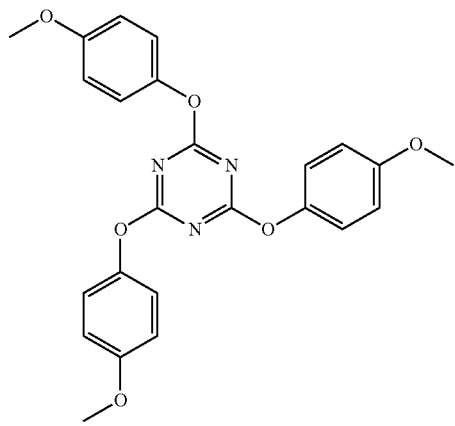
Compound No. 44
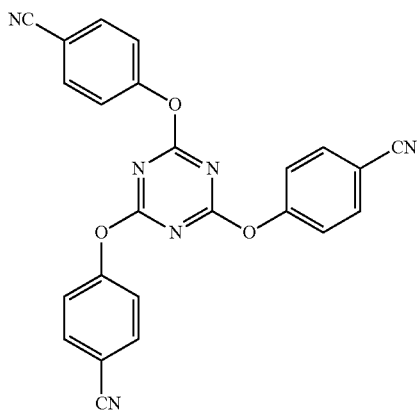
Compound No. 45
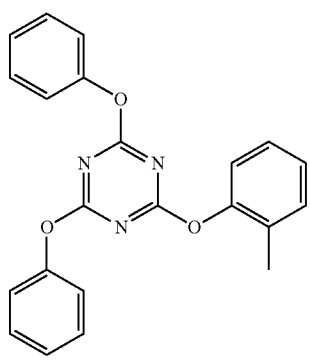
Compound No. 46
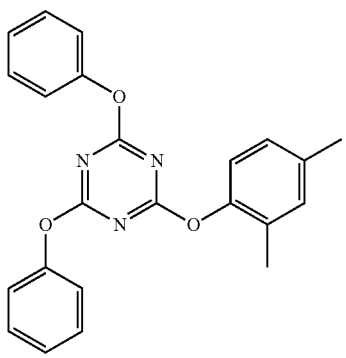
Compound No. 47
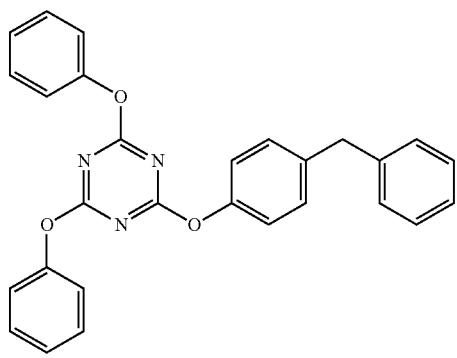

Compound No. 48
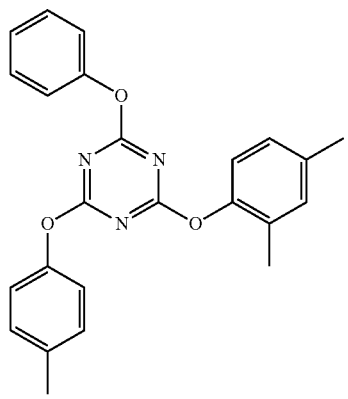
Compound No. 49
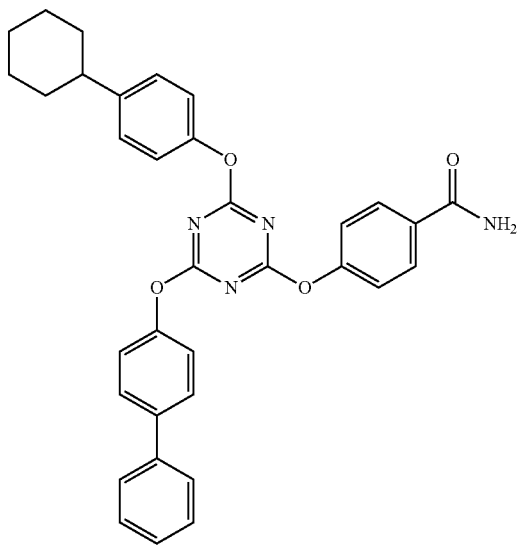
Compound No. 50
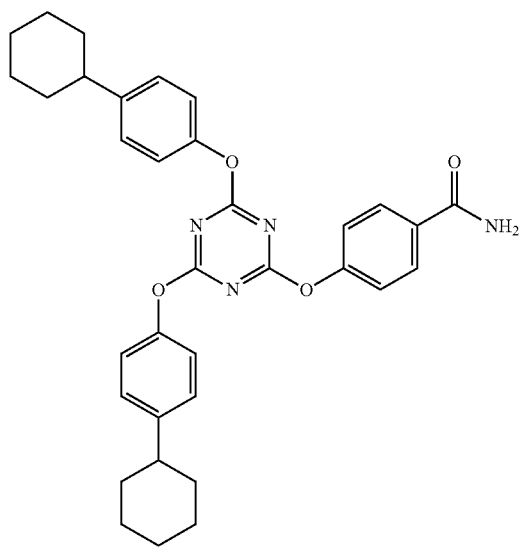
Compound No. 51
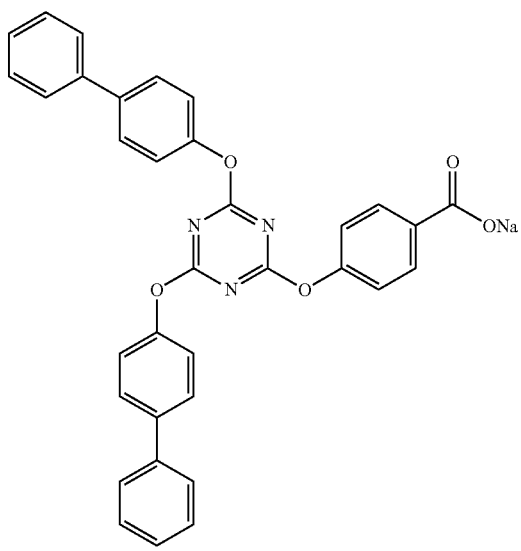

Compound No. 2
Compound No. 53
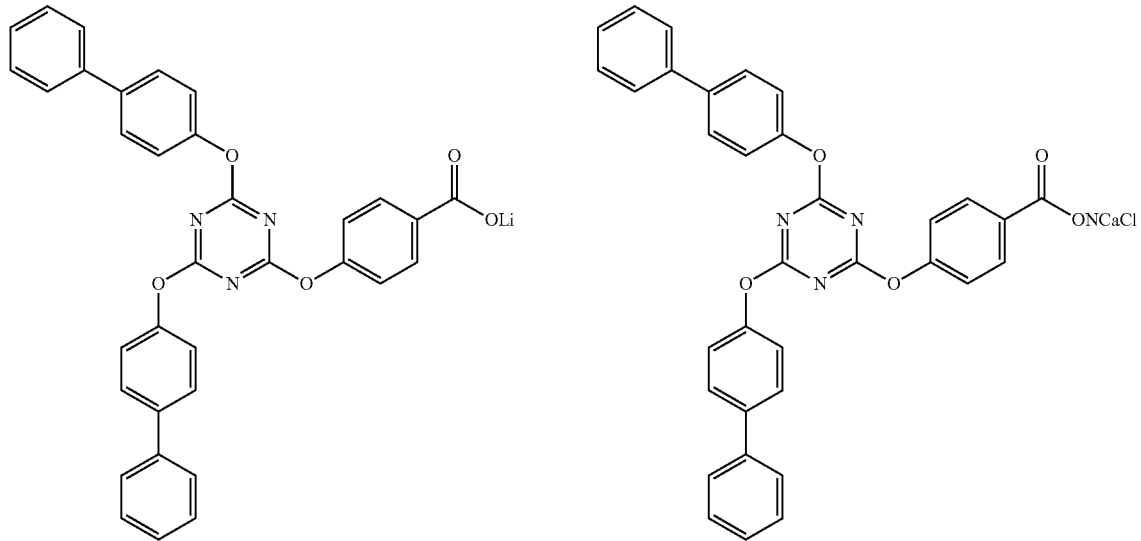
Compound No. 54
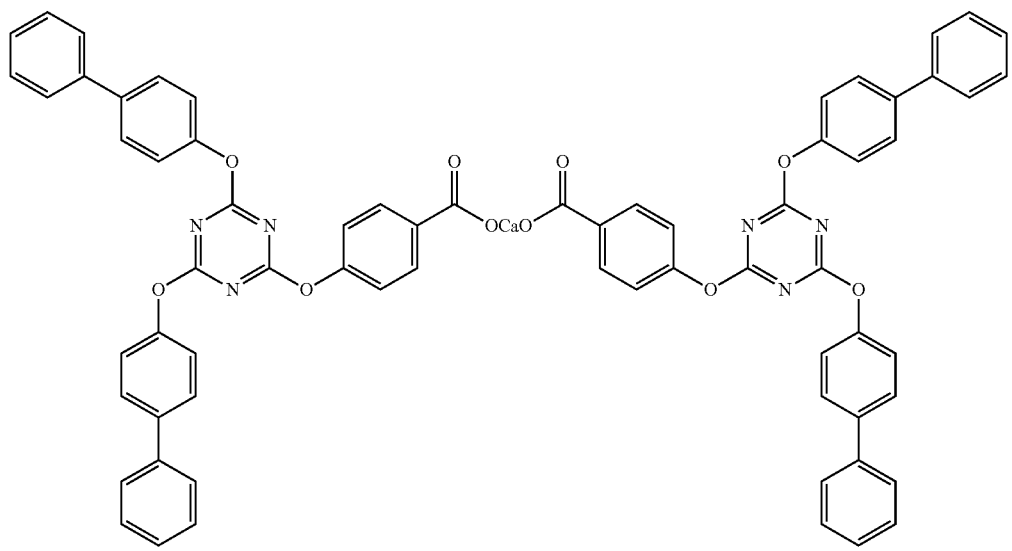

-continued
Compound No. 55
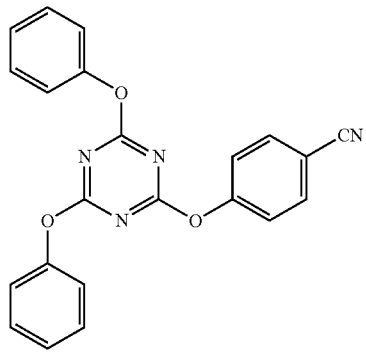
Compound No. 56
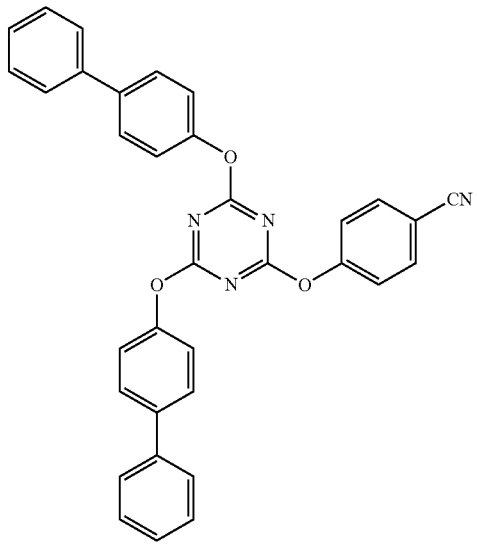
Compound No. 57
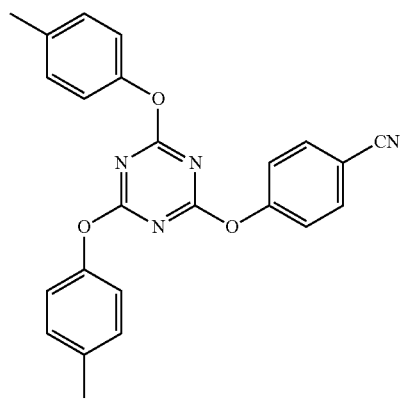
Compound No. 58
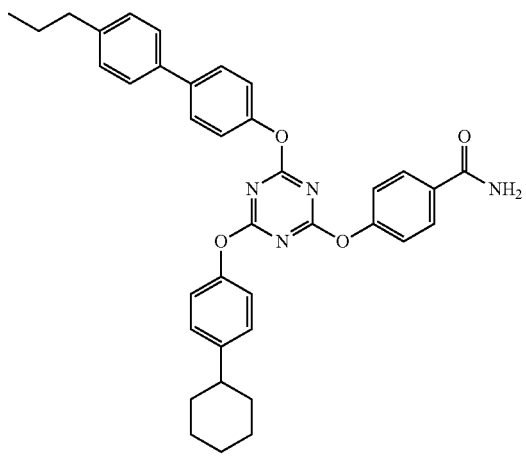
Compound No. 59
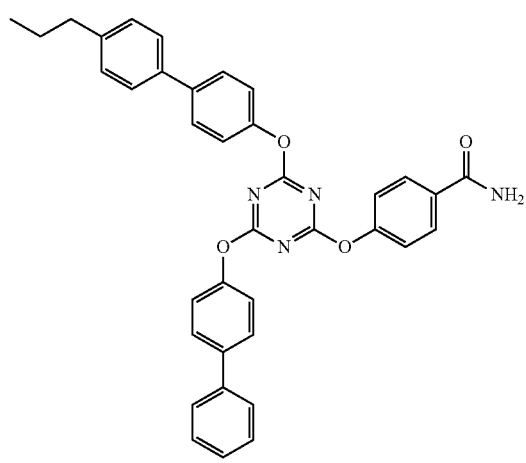

Examples of a method of producing the triazine compound represented by Formula (1) include a method of allowing, in an organic solvent, cyanuric chloride used as a raw material to sequentially react with phenol compounds each corresponding to 1 equivalent of $Ar^1$, $Ar^2$ and $Ar^3$ in the presence of 1 equivalent of a base (e.g., triethylamine or sodium hydroxide).

As described above, in Formula (2), $R^1$ represents a hydrogen atom or an alkyl group having 1 to 4 carbon atoms; $R^2$, $R^3$, $R^4$ and $R^5$ each independently represent a hydrogen atom, a halogen atom, a cyano group, an alkyl group having 1 to 4 carbon atoms, or an alkoxy group having 1 to 4 carbon atoms, or $R^2$ and $R^3$ or $R^4$ and $R^5$ are linked together to represent an alkylene group having 3 to 6 carbon atoms or an alkylenedioxy group having 1 to 4 carbon atoms; and X represents a single bond, a —CH(OH)— group, or a —CH(OH)CH(OH)— group.

Examples of the alkyl group having 1 to 4 carbon atoms include a methyl group, an ethyl group, an n-propyl group, an isopropyl group, an n-butyl group, an isobutyl group, a sec-butyl group, and a tert-butyl group.

Examples of the alkoxy group having 1 to 4 carbon atoms include a methoxy group, an ethoxy group, an n-propoxy group, an isopropoxy group, an n-butyloxy group, an isobutyloxy group, a sec-butyloxy group, and a tert-butyloxy group.

Examples of the alkylene group having 3 to 6 carbon atoms include a propylene group, a butylene group, a pentylene group, and a hexylene group.

Examples of the alkylenedioxy group having 1 to 4 carbon atoms include a methylenedioxy group, an ethylenedioxy group, a propylenedioxy group, and a butylenedioxy group.

Examples of the halogen atom include a fluorine atom, a chlorine atom, a bromine atom, and an iodine atom.

In the acetal compound represented by Formula (2), it is preferred that $R^1$, $R^2$, $R^3$, $R^4$ and $R^5$ be each independently a hydrogen atom or an alkyl group having 1 to 4 carbon atoms, and X be a —CH(OH)— group.

Specific examples of the acetal compound represented by Formula (2) include the following Compounds No. 60 to No. 63. Thereamong, an acetal compound represented by Compound No. 60, Compound No. 61, or Compound No. 62 is particularly preferred.

Compound No. 60

Compound No. 61

Compound No. 62

Compound No. 63

Examples of a method of producing the acetal compound represented by Formula (2) include a method of allowing an alditol compound such as sorbitol to undergo dehydration-condensation with arylaldehyde in the presence of an acid catalyst.

As described above, in the resin composition of the present invention, the content of the nucleating agent is 0.005 parts by mass or more but less than 0.1 parts by mass with respect to 100 parts by mass of the polyolefin-based resin. When the content of the nucleating agent is less than 0.005 parts by mass, the crystallinity of the resin component is not reduced sufficiently. Meanwhile, when the content of the nucleating agent is 0.1 parts by mass or more, the crystallinity of the resin component is enhanced. The content of the nucleating agent is preferably not less than 0.01 parts by mass, more preferably not less than 0.02 parts by mass. On the other hand, the content of the nucleating agent is preferably 0.08 parts by mass or less, more preferably 0.07 parts by mass or less, still more preferably 0.05 parts by mass or less, particularly preferably 0.03 parts by mass or less.

In addition to the above-described polyolefin-based resin and nucleating agent, the resin composition of the present invention may further contain additives, such as a phenolic antioxidant, a phosphorus-based antioxidant, a sulfur-based antioxidant, a fatty acid metal salt, an ultraviolet absorber, a hindered amine compound, a flame retardant, a flame retardant aid, a lubricant, a filler, a hydrotalcite, an antistatic agent, a fluorescent brightener, a pigment, and a dye. These additives may be incorporated individually, or in combination of two or more thereof.

Examples of the phenolic antioxidant include 2,6-di-tert-butyl-4-ethylphenol, 2-tert-butyl-4,6-dimethylphenol, styrenated phenol, 2,2'-methylene-bis(4-ethyl-6-tert-butylphenol), 2,2'-thiobis-(6-tert-butyl-4-methylphenol), 2,2'-thiodiethylene-bis[3-(3,5-di-tert-butyl-4-hydroxyphenyl)propionate], 2-methyl-4,6-bis(octylsulfanylmethyl)phenol, 2,2'-isobutylidene-bis(4,6-dimethylphenol), isooctyl-3-(3,5-di-tert-butyl-4-hydroxyphenyl)propionate, N,N-hexane-1,6-diylbis[3-(3,5-di-tert-butyl-4-hydroxyphenyl)propionamide], 2,2'-oxamide-bis[ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethylene-bis(4,6-di-tert-butylphenol), esters of 3,5-di-tert-butyl-4-hydroxybenzene-propanoic acid and a C13-15 alkyl, 2,5-di-tertamylhydroquinone, hindered phenol polymers (e.g., trade name "AO.OH.98" manufactured by ADEKA Polymer Additives Europe SAS), 2,2'-methylene-bis[6-(1-methylcyclohexyl)-p-cresol], 2-tert-butyl-6-(3-tert-butyl-2-hydroxy-5-methylbenzyl)-4-methylphenyl acrylate, 2-[1-(2-hydroxy-3,5-di-tert-pentylpheny)ethyl]-4,6-di-tert-pentylphenyl acrylate, 6-[3-(3-tert-butyl-4-hydroxy-5-methyl)propoxy]-2,4,8,10-tetra-tert-butylbenzo[d,f][1,3,2]-dioxaphosphepin, hexamethylene-bis[3-(3,5-di-tert-butyl-4-hydroxyphenyl) propionate], calcium bis[monoethyl(3,5-di-tert-butyl-4-hydroxybenzyl)phosphonate], a reaction product between 5,7-bis(1,1-dimethylethyl)-3-hydroxy-2(3H)-benzofuranone and o-xylene, 2,6-di-tert-butyl-4-(4,6-bis(octylthio)-1,3,5-triazine-2-ylamino)phenol, DL-a-tocophenol (vitamin E), 2,6-bis(α-methylbenzyl)-4-methylphenol, bis[3,3-bis-(4'-hydroxy-3'-tert-butyl-phenyl)butyric acid]glycol ester, 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, tridecyl-3,5-tert-butyl-4-hydroxybenzyl thioacetate, thiodiethylene-bis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene-bis(2,6-di-tert-butylphenol), 4,4'-butylidene-bis(6-tert-butyl-3-methylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2, 4,6-trimethylbenzene, 1,3,5-tris[(3,5-di-tert-butyl-4-hydroxyphenyl)propionyloxyethyl]isocyanurate, tetrakis [methylene-3-(3',5'-di-tert-butyl-4'-hydroxyphenyl) propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane, triethylene glycol-bis[β-(3-tert-butyl-4-hydroxy-5-methylphenyl)propionate], and 3-(3,5-dialkyl-4-hydroxyphenyl) propionic acid derivatives, such as stearyl-3-(3,5-di-tert-butyl-4-hydroxyphenyl)propionic acid amide, palmityl-3-(3, 5-di-tert-butyl-4-hydroxyphenyl)propionic acid amide, myristyl-3-(3,5-di-tert-butyl-4-hydroxyphenyl)propionic acid amide, and lauryl-3-(3,5-di-tert-butyl-4-hydroxyphenyl)propionic acid amide. These phenolic antioxidants may be incorporated individually, or in combination of two or more thereof. The content of the phenolic antioxidant(s) is not particularly restricted and may be, for example, 0.001 to 5 parts by mass with respect to 100 parts by mass of the polyolefin-based resin.

Examples of the phosphorus-based antioxidant include triphenyl phosphite, diisooctyl phosphite, heptakis(dipropylene glycol)triphosphite, triisodecyl phosphite, diphenylisooctyl phosphite, diisooctylphenyl phosphite, diphenyltridecyl phosphite, triisooctyl phosphite, trilauryl phosphite, diphenyl phosphite, tris(dipropylene glycol)phosphite, dioleyl hydrogen phosphite, trilauryl trithiophosphite, bis(tridecyl)phosphite, tris(isodecyl) phosphite, tris(tridecyl)phosphite, diphenyldecyl phosphite, dinonylphenyl-bis (nonylphenyl)phosphite, poly(dipropylene glycol)phenyl phosphite, tetraphenyldipropylene glycol diphosphite, trisnonylphenyl phosphite, tris(2,4-di-tert-butylphenyl)phosphite, tris(2,4-di-tert-butyl-5-methylphenyl)phosphite, tris [2-tert-butyl-4-(3-tert-butyl-4-hydroxy-5-methylphenylthio)-5-methylphenyl]phosphite, tri(decyl) phosphite, octyldiphenyl phosphite, di(decyl)monophenyl phosphite, mixtures of distearyl pentaerythritol and calcium stearate, alkyl(C10) bisphenol-A phosphite, tetraphenyl-tetra(tridecyl)pentaerythritol tetraphosphite, bis(2,4-di-tert-butyl-6-methylphenyl)ethyl phosphite, tetra(tridecyl)isopropylidene diphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, (1-methyl-1-propenyl-3-ylidene)tris(1,1-dimethylethyl)-5-methyl-4,1-phenylene)hexatridecyl phosphite, 2,2'-methylene-bis(4,6-tert-butylphenyl)-2-ethylhexyl phosphite, 2,2'-methylene-bis(4,6-di-tert-butylphenyl)-octadecyl phosphite, 2,2'-ethylidene-bis(4,6-di-tert-butylphenyl)fluorophosphite, 4,4'-butylidene-bis(3-methyl-6-tert-butylphenylditridecyl) phosphite, tris(2-[(2,4,8,10-tetrakis-tert-butyldibenzo[d,f][1,3,2]dioxaphosphepin-6-yl)oxy]ethyl)amine, 3,9-bis(4-nonylphenoxy)-2,4,8,10-tetraoxa-3,9-diphosphaspiro[5,5] undecane, 2,4,6-tri-tert-butylphenyl-2-butyl-2-ethyl-1,3-propanediol phosphite, poly-4,4'-isopropylidene diphenol C12-15 alcohol phosphite, bis(diisodecyl)pentaerythritol diphosphite, bis(tridecyl)pentaerythritol diphosphite, bis(octadecyl)pentaerythritol diphosphite, bis(nonylphenyl)pentaerythritol diphosphite, bis(2,4-di-tert-butylphenyl)pentaerythritol diphosphite, bis(2,4,6-tri-tert-butylphenyl) pentaerythritol diphosphite, bis(2,6-di-tert-butyl-4-methylphenyl)pentaerythritol diphosphite, and bis(2,4-dicumylphenyl)pentaerythritol diphosphite. These phosphorus-based antioxidants may be incorporated individually, or in combination of two or more thereof. The content of the phosphorus-based antioxidant(s) is not particularly restricted and may be, for example, 0.001 to 10 parts by mass with respect to 100 parts by mass of the polyolefin-based resin.

Examples of the sulfur-based antioxidant include tetrakis [methylene-3-(laurylthio)propionate]methane, bis(methyl-4-[3-n-alkyl(C12/C14)thiopropionyloxy]-5-tert-butylphenyl)sulfide, ditridecyl-3,3'-thiodipropionate, dilauryl-3,3'-thiodipropionate, dimyristyl-3,3'-thiodipropionate, distearyl-3,3'-thiodipropionate, lauryl/stearyl thiodipropionate, 4,4'-thiobis(6-tert-butyl-m-cresol), 2,2'-thiobis(6-tert-butyl-p-cresol), distearyl disulfide. These sulfur-based antioxidants may be incorporated individually, or in combination of two or more thereof. The content of the sulfur-based antioxidant(s) is not particularly restricted and may be, for example, 0.001 to 10 parts by mass with respect to 100 parts by mass of the polyolefin-based resin.

Examples of the fatty acid metal salt include compounds represented by the following Formula (3). These fatty acid metal salts may be incorporated individually, or in combination of two or more thereof.

(3)

In Formula (3), $R^6$ represents a group formed by removing COOH from a linear or branched fatty acid having 12 to 20 carbon atoms, which fatty acid is optionally substituted with a hydroxy group; M represents a monovalent to trivalent metal atom optionally having hydroxy; and n represents an integer of 1 to 3. Among such fatty acid metal salts, a metal salt of lauric acid, myristic acid, palmitic acid, stearic acid, or 12-hydroxystearic acid is particularly preferred. Examples of the monovalent to trivalent metal atom include sodium, potassium, lithium, calcium, zinc, barium, magnesium and hydroxyaluminum, and the monovalent to trivalent metal atom is particularly preferably sodium, lithium, potassium, calcium, or zinc. The content of the fatty acid metal salt(s) is not particularly restricted and may be, for example, 0.001 to 10 parts by mass with respect to 100 parts by mass of the polyolefin-based resin.

Examples of the ultraviolet absorber include; 2-hydroxybenzophenones, such as 2,4-dihydroxybenzophenone and 5,5'-methylene-bis(2-hydroxy-4-methoxybenzophenone); 2-(2-hydroxyphenyl)benzotriazoles, such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolyl phenol), polyethylene glycol esters of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole, and 2-[2-hydroxy-4-(3-methacryloyloxypropyl)phenyl]benzotriazole; phenyl salicylate; resorcinol monobenzoate; substituted oxanilides, such as 2-ethyl-2'-ethoxyoxanilide and 2-ethoxy-4'-dodecyloxanilide; cyanoacrylates, such as ethyl-$\alpha$-cyano-$\beta,\beta$-diphenyl acrylate and methyl-2-cyano-3-methyl-3-(p-methoxyphenyl)acrylate; triazines, such as 2-(4,6-diphenyl-1,3,5-triazine-2-yl)-5-hexyloxyphenol, 2-(2-hydroxy-4-octoxyphenyl)-4,6-bis(2,4-dimethylphenyl)-1,3,5-triazine, trioctyl-2,2',2"-((1,3,5-triazine-2,4,6-triyl)tris(3-hydroxybenzene-4-,1-diyl)tripropionate), 2-(4,6-diphenyl-1,3,5-triazine-2-yl)-5-[2-(2-ethylhexanoyloxy)ethoxy]phenol, 2,4,6-tris(2-hydroxy-4-hexyloxy-3-methylphenyl)-1,3,5-triazine, and 1,12-bis[2-[4-(4,6-diphenyl-1,3,5-triazine-2-yl)-3-hydroxyphenoxy]ethyl]dodecane dioate; and a variety of metal salts and metal chelates, particularly salts and chelates of nickel and chromium. These ultraviolet absorbers may be incorporated individually, or in combination of two or more thereof. The content of the ultraviolet absorber(s) is not particularly restricted and may be, for example, 0.01 to 10 parts by mass with respect to 100 parts by mass of the polyolefin-based resin.

Examples of the hindered amine compound include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)·di(tridecyl)-1,2,3,4-butanetetracarboxylate, bis(1,2,2,6,6-pentamethyl-4-piperidyl)·di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensates, 1,6-bis(2,2,6,6-tetramethyl-4-piperidylamino)hexane/2,4-dichloro-6-morpholino-s-triazine polycondensates, 1,6-bis(2,2,6,6-tetramethyl-4-piperidylamino)hexane/2,4-dichloro-6-tert-octylamino-s-triazine polycondensates, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-yl]aminoundecane, 1,6,11-tris[2,4-bis(N-butyl-N-(1,2,2,6,6-pentamethyl-4-piperidyl)amino)-s-triazine-6-yl]aminoundecane, bis{4-(1-octyloxy-2,2,6,6-tetramethyl)piperidyl}decanedionate, and bis{4-(2,2,6,6-tetramethyl-1-undecyloxy)piperidyl)carbonate. These hindered amine compounds may be incorporated individually, or in combination of two or more thereof. The content of the hindered amine compound(s) is not particularly restricted and may be, for example, 0.001 to 10 parts by mass with respect to 100 parts by mass of the polyolefin-based resin.

Examples of the flame retardant include: aromatic phosphates, such as triphenyl phosphate, tricresyl phosphate, trixylenyl phosphate, cresyldiphenyl phosphate, cresyl-2,6-dixylenyl phosphate, resorcinol-bis(diphenylphosphate), (1-methylethylidene)-4,1-phenylene tetraphenyldiphosphate, and 1,3-phenylene-tetrakis(2,6-dimethylphenyl)phosphate, as well as "ADK STAB FP-500", "ADK STAB FP-600" and "ADK STAB FP-800" (trade names, manufactured by ADEKA Corporation); phosphonates, such as divinyl phenylphosphonate, diallyl phenylphosphonate, and (1-butenyl) phenylphosphonate; phosphinates, such as phenyl diphenylphosphinate, methyl diphenylphosphinate, and 9,10-dihydro-9-oxa-10-phosphaphenanthlene-10-oxide derivatives; phosphazene compounds, such as bis(2-allylphenoxy)phosphazene and dicresyl phosphazene; phosphorus-based flame retardants, such as melamine phosphate, melamine pyrophosphate, melamine polyphosphate, melam polyphosphate, ammonium polyphosphate, piperazine phosphate, piperazine pyrophosphate, piperazine polyphosphate, phosphorus-containing vinylbenzyl compounds, and red phosphorus; metal hydroxides, such as magnesium hydroxide and aluminum hydroxide; and bromine-based flame retardants, such as brominated bisphenol A-type epoxy resins, brominated phenol novolac-type epoxy resins, hexabromobenzene, pentabromotoluene, ethylene-bis(pentabromophenyl), ethylene-bis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromobisphenol A-type dimethacrylate, pentabromobenzyl acrylate, and brominated styrene. These flame retardants may be incorporated individually, or in combination of two or more thereof. These flame retardants are preferably used in combination with a drip inhibitor such as a fluorocarbon resin, and/or a flame retardant aid such as a polyhydric alcohol or hydrotalcite. The content of the flame retardant(s) is not particularly restricted and may be, for example, 1 to 100 parts by mass with respect to 100 parts by mass of the polyolefin-based resin. The content of the flame retardant aid is also not particularly restricted and may be, for example, 0.1 to 10 parts by mass with respect to 100 parts by mass of the flame retardant.

Examples of the lubricant include: unsaturated fatty acid amides, such as oleic acid amide and erucic acid amide; saturated fatty acid amides, such as behenic acid amide and stearic acid amide; butyl stearate; stearyl alcohol; stearic acid monoglyceride; sorbitan monopalmitate; sorbitan monostearate; mannitol; stearic acid; hardened castor oil; stearic acid amide; oleic acid amide; and ethylene-bis stearic acid amide. These lubricants may be incorporated individually, or in combination of two or more thereof. The content of the lubricant(s) is not particularly restricted and may be, for example, 0.01 to 2 parts by mass with respect to 100 parts by mass of the polyolefin-based resin.

Fillers are broadly classified into organic fillers and inorganic fillers. Examples of the organic fillers include: naturally-occurring polymers, such as starch, cellulose, wood powder, bean curd refuse, rice husk, and bran; and modified products thereof. Examples of the inorganic fillers include talc, calcium carbonate, zinc carbonate, wollastonite, silica, mica, alumina, magnesium oxide, calcium silicate, sodium aluminate, calcium aluminate, sodium aluminosilicate, magnesium silicate, glass balloon, carbon black, zinc oxide, antimony trioxide, zeolite, metal fibers, metal whiskers, ceramic whiskers, potassium titanate, boron nitride, graphites, and carbon fibers. These fillers may be incorporated individually, or in combination of two or more thereof. The content of the filler(s) is not particularly restricted and may be, for example, 0.1 to 500 parts by mass with respect to 100 parts by mass of the polyolefin-based resin.

The above-described hydrotalcite is a complex salt compound which is known as a natural or synthetic product and composed of magnesium, aluminum, hydroxy groups, a carbonate group and arbitrary crystal water, and examples thereof include: hydrotalcites in which some of the magnesium or aluminum atoms are substituted with other metal such as an alkali metal or zinc; and hydrotalcites in which the hydroxy group(s) and/or carbonate group is/are substituted with other anionic group(s), specifically hydrotalcites represented by the following Formula (4) in which a metal is substituted with an alkali metal. In addition, as an Al—Li hydrotalcite, a compound represented by the following Formula (5) can be used as well.

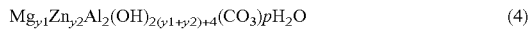

$$Mg_{y1}Zn_{y2}Al_2(OH)_{2(y1+y2)+4}(CO_3)pH_2O \quad (4)$$

wherein, y1 and y2 each represent a number that satisfies the conditions represented by the following equations, and p represents 0 or a positive number: $0 \leq y2/y1 < 10$, $2 \leq (y1+y2) \leq 20$.

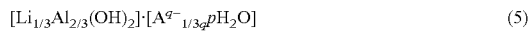

$$[Li_{1/3}Al_{2/3}(OH)_2] \cdot [A^{q-}_{1/3q} pH_2O] \quad (5)$$

wherein, $A^{q-}$ represents a q-valent anion, and p represents 0 or a positive number.

Further, the carbonate anions in these hydrotalcites may be partially substituted with other anions.

In these hydrotalcites, the crystal water may be dehydrated, and the hydrotalcites may be coated with, for example, a higher fatty acid such as stearic acid, a higher fatty acid metal salt such as alkali metal oleate, a metal organic sulfonate such as alkali metal dodecylbenzenesulfonate, a higher fatty acid amide, a higher fatty acid ester, or a wax.

The hydrotalcites may be naturally-occurring or synthetic hydrotalcites. Examples of a synthesis method thereof include known methods that are described in JPS46-2280, JPS50-30039B1, JPS51-29129, JPH03-36839B2, JPS61-174270A, JPH05-179052A, and the like. Further, the above-exemplified hydrotalcites can be used without any restriction in terms of their crystal structures, crystal particles and the like. The content of the hydrotalcite(s) is not particularly restricted and may be, for example, 0.001 to 5 parts by mass with respect to 100 parts by mass of the polyolefin-based resin.

Examples of the antistatic agent include low-molecular-weight antistatic agents based on nonionic, anionic, cationic or amphoteric surfactants, and high-molecular-weight antistatic agents based on polymer compounds. Examples of the nonionic surfactants include: polyethylene glycol-type nonionic surfactants, such as higher alcohol ethylene oxide adducts, fatty acid ethylene oxide adducts, higher alkylamine ethylene oxide adducts, and polypropylene glycol ethylene oxide adducts; and polyhydric alcohol-type nonionic surfactants, such as polyethylene oxides, glycerin fatty acid esters, pentaerythritol fatty acid esters, sorbitol or sorbitan fatty acid esters, polyhydric alcohol alkyl ethers, and alkanolamine aliphatic amides. Examples of the anionic surfactants include: carboxylates, such as alkali metal salts of higher fatty acids; sulfates, such as higher alcohol sulfates and higher alkyl ether sulfates; sulfonates, such as alkylbenzene sulfonates, alkyl sulfonates, and paraffin sulfonates; and phosphates such as higher alcohol phosphates, and examples of the cationic surfactants include quaternary ammonium salts, such as alkyltrimethyl ammonium salts. Examples of the amphoteric surfactants include: amino acid-type amphoteric surfactants, such as higher alkyl aminopropionates; and betaine-type amphoteric surfactants, such as higher alkyl dimethylbetaines and higher alkyl dihydroxyethylbetaines. These low-molecular-weight antistatic agents may be incorporated individually, or in combination of two or more thereof. The content of the low-molecular-weight antistatic agent(s) is not particularly restricted and may be, for example, 0.1 to 10 parts by mass with respect to 100 parts by mass of the polyolefin-based resin.

Examples of the high-molecular-weight antistatic agents include ionomers, and block polymers containing a polyethylene glycol as a hydrophilic moiety. Examples of the ionomers include the ionomer disclosed in JP2010-132927A. Examples of the polymers containing a polyethylene glycol as a hydrophilic moiety include the polyether ester amide disclosed in JPH07-10989A, the polymer disclosed in U.S. Pat. No. 6,552,131B1 which is composed of a polyolefin and a polyethylene glycol, and the polymer disclosed in JP2016-023254A which is composed of a polyester and a polyethylene glycol. These high-molecular-weight antistatic agents may be incorporated individually, or in combination of two or more thereof. The content of the high-molecular-weight antistatic agent(s) is not particularly restricted and may be, for example, 3 to 60 parts by mass with respect to 100 parts by mass of the polyolefin-based resin.

Examples of the fluorescent brightener include C.I. Fluorescent Brightener 184, which is a benzoxazole-based compound; C.I. Fluorescent Brightener 52, which is a coumarin-based compound; and C.I. Fluorescent Brighteners 24, 85 and 71, which are diaminostilbene disulfonic acid-based compounds. These fluorescent brighteners may be incorporated individually, or in combination of two or more thereof. The content of the fluorescent brightener(s) is not particularly restricted and may be, for example, 0.00001 to 0.1 parts by mass with respect to 100 parts by mass of the polyolefin-based resin.

As the pigment, a commercially available pigment can be used, and examples thereof include PIGMENT RED 1, 2, 3, 9, 10, 17, 22, 23, 31, 38, 41, 48, 49, 88, 90, 97, 112, 119, 122, 123, 144, 149, 166, 168, 169, 170, 171, 177, 179, 180, 184, 185, 192, 200, 202, 209, 215, 216, 217, 220, 223, 224, 226, 227, 228, 240, and 254; PIGMENT ORANGE 13, 31, 34, 36, 38, 43, 46, 48, 49, 51, 52, 55, 59, 60, 61, 62, 64, 65, and 71; PIGMENT YELLOW 1, 3, 12, 13, 14, 16, 17, 20, 24, 55, 60, 73, 81, 83, 86, 93, 95, 97, 98, 100, 109, 110, 113, 114, 117, 120, 125, 126, 127, 129, 137, 138, 139, 147, 148, 150, 151, 152, 153, 154, 166, 168, 175, 180, and 185; PIGMENT GREEN 7, 10, and 36; PIGMENT BLUE 15, 15:1, 15:2, 15:3, 15:4, 15:5, 15:6, 22, 24, 29, 56, 60, 61, 62, and 64; and PIGMENT VIOLET 1, 15, 19, 23, 27, 29, 30, 32, 37, 40, and 50. These pigments may be incorporated individually, or in combination of two or more thereof. The content of the pigment(s) is not particularly restricted and may be, for example, 0.0005 to 3 parts by mass with respect to 100 parts by mass of the polyolefin-based resin.

Examples of the dye include azo dyes, anthraquinone dyes, indigoid dyes, triarylmethane dyes, xanthene dyes, alizarin dyes, acridine dyes, stilbene dyes, thiazole dyes, naphthol dyes, quinoline dyes, nitro dyes, indamine dyes, oxazine dyes, phthalocyanine dyes, and cyanine dyes. These dyes may be incorporated individually, or in combination of two or more thereof. The content of the dye(s) is not particularly restricted and may be, for example, 0.0005 to 3 parts by mass with respect to 100 parts by mass of the polyolefin-based resin.

A method of producing the resin composition of the present invention is not particularly restricted, and examples thereof include a method of dry-blending the polyolefin-based resin in a powder or pellet form with the nucleating agent and, as required, other additives; and a method of further melt-kneading the resultant after the dry-blending. The nucleating agent and other additives may be added to the polyolefin-based resin simultaneously or separately. Further, the nucleating agent and other additives may be added to the polyolefin-based resin as a masterbatch.

<Molded Article>

Next, the molded article of the present invention will be described.

The molded article of the present invention is obtained by molding the resin composition of the present invention.

The molded article of the present invention is, for example, a molded article in which the crystallinity of a resin component is required to be sufficiently reduced at the time of the production. More specific examples of such a molded article include laminates obtained by laminating synthetic fibers, a film, or a resin on a base material made of a woody or fibrous material.

A method of producing the molded article of the present invention is not particularly restricted, and examples thereof include molding methods, such as injection molding, extrusion molding, blow molding, rotational molding, vacuum molding, inflation molding, calender molding, slush molding, dip molding, and foam molding. Among these molding methods, extrusion molding and calender molding are particularly preferred.

EXAMPLES

The present invention will now be described in more detail by way of Examples thereof; however, the present invention is not restricted thereto by any means.

Experimental Examples 1 to 6 and Reference Example 1

<Confirmation of Crystallization Temperature when 0.2 Parts by Mass of Nucleating Agent was Added with Respect to 100 Parts by Mass of Polyolefin-Based Resin>

The crystallization temperature of a polyolefin-based resin was confirmed when each of the below-described nucleating agents 1 to 6 was added in an amount of 0.2 parts by mass with respect to 100 parts by mass of the polyolefin-based resin. The below-described polyolefin-based resin, nucleating agents, antioxidants, and fatty acid metal salt were added at the respective ratios shown in Table 1 and mixed using a Henschel mixer, and the resulting mixtures were each melt-kneaded using a twin-screw extruder (TEX-28V, manufactured by The Japan Steel Works, Ltd.) at an extrusion temperature of 230° C. and subsequently granulated, whereby resin composition pellets of Experimental Examples 1 to 6 and Reference Example 1 were obtained. In Table 1, the unit of the amount of each component is parts by mass. For the thus obtained resin composition pellets, the crystallization temperature was measured by the following procedure.

Polyolefin-based resin: a homopolypropylene having a melt flow rate of 7.7 g/10 min as measured at a cylinder temperature of 230° C. and a load of 2.16 kg, melting point=160° C.

Nucleating agent 1: triazine compound No. 59, melting point=202.7° C.

Nucleating agent 2: triazine compound No. 58, melting point=189.3° C.

Nucleating agent 3: triazine compound No. 50, melting point=217.7° C.

Nucleating agent 4: acetal compound No. 60, melting point=274.8° C.

Nucleating agent 5: acetal compound No. 61, melting point=244.7° C.

Nucleating agent 6: lithium 2,2'-methylene-bis(4,6-di-tert-butylphenyl) phosphate, melting point=400° C. or higher (no endothermic peak was observed)

Antioxidant 1: tetrakis[methylene-3-(3',5'-di-tert-butyl-4'-hydroxyphenyl)propionate]methane Antioxidant 2: tris(2,4-di-tert-butylphenyl)phosphite Fatty acid metal salt: calcium stearate It is noted here that the "melting point" of each nucleating agent is the temperature (° C.) of an endothermic peak that is observed when the nucleating agent is heated from 50° C. to 400° C. at a rate of 10° C./min under a nitrogen atmosphere using a differential scanning calorimeter (DIAMOND, manufactured by PerkinElmer Co., Ltd.).

<Crystallization Temperature>

After cutting each of the thus obtained resin composition pellets into small pieces, 5 mg thereof was placed on an aluminum pan, and the crystallization temperature was measured using a differential scanning calorimeter (DIAMOND, manufactured by PerkinElmer Co., Ltd.). The small pieces were heated from 50° C. to 230° C. at a rate of 10° C./min, maintained for 5 minutes, and then cooled to 50° C. at a rate of 10° C./min, and the crystallization temperature was determined as the temperature (° C.) of an endothermic peak that was observed in the cooling process. The results thereof are shown in Table 1.

TABLE 1

|  | Experimental Example 1 | Experimental Example 2 | Experimental Example 3 | Experimental Example 4 | Experimental Example 5 | Experimental Example 6 | Reference Example 1 |
|---|---|---|---|---|---|---|---|
| Polyolefin-based resin | 100 | 100 | 100 | 100 | 100 | 100 | 100 |
| Nucleating agent 1 | 0.2 | — | — | — | — | — | — |
| Nucleating agent 2 | — | 0.2 | — | — | — | — | — |
| Nucleating agent 3 | — | — | 0.2 | — | — | — | — |
| Nucleating agent 4 | — | — | — | 0.2 | — | — | — |
| Nucleating agent 5 | — | — | — | — | 0.2 | — | — |
| Nucleating agent 6 | — | — | — | — | — | 0.2 | — |
| Antioxidant 1 | 0.05 | 0.05 | 0.05 | 0.05 | 0.05 | 0.05 | 0.05 |
| Antioxidant 2 | 0.1 | 0.1 | 0.1 | 0.1 | 0.1 | 0.1 | 0.1 |
| Fatty acid metal salt | 0.05 | 0.05 | 0.05 | 0.05 | 0.05 | 0.05 | 0.05 |
| Crystallization temperature (° C.) | 124.5 | 124.7 | 131.5 | 127.8 | 124.8 | 129.3 | 113.2 |

According to the results shown in Table 1, the resin compositions of Experimental Examples 1 to 6 had a crystallization temperature of at least 7° C. higher than that of the resin composition of Reference Example 1. Therefore, the nucleating agents 1 to 6, when added in an amount of 0.2 parts by mass with respect to 100 parts by mass of the polyolefin-based resin, increased the crystallization temperature of the polyolefin-based resin by at least 7° C.

Examples 1 to 10 and Comparative Examples 1 to 7

<Preparation of Resin Compositions and Evaluation of Properties>

The above-described polyolefin-based resin, nucleating agents, antioxidants, and fatty acid metal salt were added at the respective ratios shown in Tables 2 to 4 and mixed using a Henschel mixer, and the resulting mixtures were each melt-kneaded using a twin-screw extruder (TEX-28V, manufactured by The Japan Steel Works, Ltd.) at an extrusion temperature of 230° C. and subsequently granulated, whereby resin composition pellets of Examples 1 to 10 and Comparative Examples 1 to 7 were obtained. In Tables 2 to 4, the unit of the amount of each component is parts by mass. Further, for the thus obtained resin composition pellets, the crystallization temperature was measured by the same procedure as in Experimental Example 1. The results thereof are shown in Tables 2 to 4.

TABLE 2

|  | Example 1 | Example 2 | Example 3 | Example 4 | Example 5 | Example 6 |
|---|---|---|---|---|---|---|
| Polyolefin-based resin | 100 | 100 | 100 | 100 | 100 | 100 |
| Nucleating agent 1 | 0.02 | 0.05 | — | — | — | — |
| Nucleating agent 2 | — | — | 0.02 | 0.05 | — | — |
| Nucleating agent 3 | — | — | — | — | 0.01 | 0.02 |
| Nucleating agent 4 | — | — | — | — | — | — |
| Nucleating agent 5 | — | — | — | — | — | — |
| Nucleating agent 6 | — | — | — | — | — | — |
| Antioxidant 1 | 0.05 | 0.05 | 0.05 | 0.05 | 0.05 | 0.05 |
| Antioxidant 2 | 0.1 | 0.1 | 0.1 | 0.1 | 0.1 | 0.1 |
| Fatty acid metal salt | 0.05 | 0.05 | 0.05 | 0.05 | 0.05 | 0.05 |
| Crystallization temperature (° C.) | 111.8 | 112.1 | 111.5 | 112.9 | 111.2 | 112.1 |

TABLE 3

|  | Comparative Example 1 | Comparative Example 2 | Example 7 | Example 8 | Example 9 | Example 10 |
|---|---|---|---|---|---|---|
| Polyolefin-based resin | 100 | 100 | 100 | 100 | 100 | 100 |
| Nucleating agent 1 | 0.1 | — | — | — | — | — |
| Nucleating agent 2 | — | 0.1 | — | — | — | — |
| Nucleating agent 3 | — | — | — | — | — | — |
| Nucleating agent 4 | — | — | 0.02 | 0.05 | — | — |
| Nucleating agent 5 | — | — | — | — | 0.02 | 0.05 |
| Nucleating agent 6 | — | — | — | — | — | — |
| Antioxidant 1 | 0.05 | 0.05 | 0.05 | 0.05 | 0.05 | 0.05 |
| Antioxidant 2 | 0.1 | 0.1 | 0.1 | 0.1 | 0.1 | 0.1 |
| Fatty acid metal salt | 0.05 | 0.05 | 0.05 | 0.05 | 0.05 | 0.05 |
| Crystallization temperature (° C.) | 116.4 | 122.2 | 112.3 | 113.1 | 111.4 | 111.4 |

TABLE 4

|  | Comparative Example 3 | Comparative Example 4 | Comparative Example 5 | Comparative Example 6 | Comparative Example 7 |
|---|---|---|---|---|---|
| Polyolefin-based resin | 100 | 100 | 100 | 100 | 100 |
| Nucleating agent 1 | — | — | — | — | — |
| Nucleating agent 2 | — | — | — | — | — |
| Nucleating agent 3 | — | — | — | — | — |
| Nucleating agent 4 | 0.1 | — | — | — | — |
| Nucleating agent 5 | — | 0.1 | — | — | — |
| Nucleating agent 6 | — | — | 0.02 | 0.05 | — |
| Antioxidant 1 | 0.05 | 0.05 | 0.05 | 0.05 | 0.05 |
| Antioxidant 2 | 0.1 | 0.1 | 0.1 | 0.1 | 0.1 |
| Fatty acid metal salt | 0.05 | 0.05 | 0.05 | 0.05 | 0.05 |
| Crystallization temperature (° C.) | 120.5 | 116.0 | 127.6 | 128.7 | 113.2 |

Examples 11 and 12, and Comparative Example 8

A polyolefin-based resin, a nucleating agent, antioxidants, and a fatty acid metal salt were added at the respective ratios shown in Table 5 and mixed using a Henschel mixer, and the resulting mixtures were each melt-kneaded using a twin-screw extruder (LABO-PLASTOMILL μ, manufactured by Toyo Seiki Seisaku-sho, Ltd.) at an extrusion temperature of 230° C. and subsequently granulated, whereby resin composition pellets of Examples 11 and 12 and Comparative Example 8 were obtained. In Table 5, the unit of the amount of each component is parts by mass. The thus obtained resin composition pellets were each melt-compressed using a 50-t press machine under the conditions of 230° C. and 10 MPa for 5 minutes to obtain 10 cm-square sheets of 1.0 mm in thickness. A disk-shaped test piece of 25 mm in diameter was cut out from each of the thus obtained sheets and, for this test piece, the flow-field crystallization temperature was measured by the following procedure.

First, the test piece was set on a rotary rheometer equipped with parallel plates of 25 mm in diameter (DHR2, manufactured by TA Instruments Inc.) and heated at 200° C. for 3 minutes under a nitrogen atmosphere, after which the gap was set at 0.9 mm and excess resin was removed. Subsequently, the conditions of the rheometer were set at a strain amount of 1%, an angular velocity of 1 rad/s, a start temperature of 200° C., and a cooling rate of 5° C./min to perform a dynamic viscoelasticity measurement. The complex viscosity value η*(Pa·s) obtained by this measurement was plotted against the measurement temperature (° C.). FIG. 1 shows a graph obtained by plotting η*(Pa·s) against the measurement temperature (° C.) for the resin composition of Example 12. It is noted here that, in FIG. 1, the ordinate has a common logarithmic scale. As shown in FIG. 1, the slope of the tangent line of the graph largely changes before and after crystallization of the resin component. At points immediately before and after the large change of the slope of this tangent line, tangent lines were drawn, and the temperature corresponding to the intersection of the thus drawn two tangent lines was defined as the flow-field crystallization temperature $T_C$ (° C.) and used as an index of the crystallinity of the resin component in a flow field. Graphs were also prepared in the same manner for the resin compositions of Example 11 and Comparative Example 8, and the flow-field crystallization temperature $T_C$ was determined. The results thereof are shown in Table 5.

TABLE 5

|  | Example 11 | Example 12 | Comparative Example 8 |
|---|---|---|---|
| Thermoplastic resin | 100 | 100 | 100 |
| Nucleating agent 5 | 0.02 | 0.08 | — |
| Antioxidant 1 | 0.05 | 0.05 | 0.05 |
| Antioxidant 2 | 0.1 | 0.1 | 0.1 |
| Fatty acid metal salt | 0.05 | 0.05 | 0.05 |
| Tc (° C.) | 120.6 | 121.1 | 123.4 |

According to the results shown in Tables 2 to 4, as compared to the resin composition of Comparative Example 7, the resin compositions of Examples 1 to 10 had a lower crystallization temperature and exhibited a reduced crystallinity of the resin component. On the other hand, as compared to the resin composition of Comparative Example 7, the resin compositions of Comparative Examples 1 to 6 had a higher crystallization temperature and were thus not considered to have a reduced crystallinity of the resin component. Moreover, according to the results shown in Table 5, as compared to the resin composition of Comparative Example 8, the resin compositions of Examples 11 and 12 had a lower flow-field crystallization temperature $T_C$ and a reduced crystallinity of the resin component.

From the above, the resin composition of the present invention was confirmed to have a reduced crystallinity of its resin component.

The invention claimed is:

1. A method of reducing a crystallinity of a polyolefin-based resin, comprising:
adding a nucleating agent and a fatty acid metal salt to a polyolefin-based resin such that the nucleating agent is contained in an amount of 0.005 to 0.08 parts by mass and the fatty acid metal salt is contained in an amount of 0.001 to 0.05 parts by mass, with respect to 100 parts by mass of the polyolefin-based resin,
wherein the nucleating agent comprises an acetal compound represented by the following Formula (2):

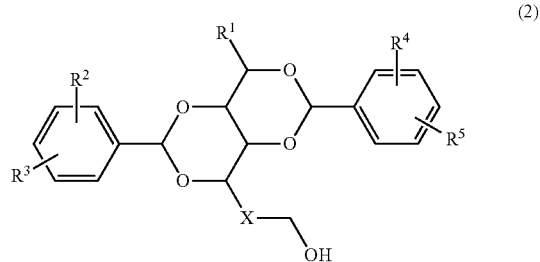

wherein, $R^1$ represents an alkyl group having 1 to 4 carbon atoms; $R^2$, $R^3$, $R^4$ and $R^5$ each independently represent a hydrogen atom, a halogen atom, a cyano group, an alkyl group having 1 to 4 carbon atoms, or an alkoxy group having 1 to 4 carbon atoms, or $R^2$ and $R^3$ or $R^4$ and $R^5$ are linked together to represent an alkylene group having 3 to 6 carbon atoms or an alkylenedioxy group having 1 to 4 carbon atoms; and X represents a single bond, a —CH(OH)— group, or a —CH(OH)CH(OH)— group.

* * * * *